US012561421B2

(12) United States Patent
Gomes et al.

(10) Patent No.: US 12,561,421 B2
(45) Date of Patent: Feb. 24, 2026

(54) DIAGNOSE INSTRUCTION TO EXECUTE VERIFICATION CERTIFICATE RELATED FUNCTIONS

(71) Applicant: INTERNATIONAL BUSINESS MACHINES CORPORATION, Armonk, NY (US)

(72) Inventors: Louis P. Gomes, Poughkeepsie, NY (US); David Harold Surman, Milton, NY (US); Peter Jeremy Relson, Ulster Park, NY (US); Seth E. Lederer, Staatsburg, NY (US); Thomas Mathias, Vestal, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 18/173,147

(22) Filed: Feb. 23, 2023

(65) Prior Publication Data

US 2024/0289428 A1 Aug. 29, 2024

(51) Int. Cl.
G06F 21/44 (2013.01)
G06F 21/62 (2013.01)

(52) U.S. Cl.
CPC .......... G06F 21/44 (2013.01); G06F 21/6218 (2013.01)

(58) Field of Classification Search
None
See application file for complete search history.

(56) References Cited

U.S. PATENT DOCUMENTS

| | | | | |
|---|---|---|---|---|
| 6,463,535 | B1 * | 10/2002 | Drews | G06F 21/575 |
| | | | | 713/176 |
| 8,555,049 | B2 | 10/2013 | Takayama et al. | |
| 8,560,820 | B2 | 10/2013 | de Cesare et al. | |
| 8,892,862 | B2 | 11/2014 | Nicolson et al. | |
| 2009/0327741 | A1 | 12/2009 | Zimmer et al. | |
| 2010/0169633 | A1 | 7/2010 | Zimmer et al. | |

(Continued)

FOREIGN PATENT DOCUMENTS

| | | |
|---|---|---|
| CN | 120660087 A | 9/2025 |
| WO | 2024/175385 A1 | 8/2024 |

OTHER PUBLICATIONS

Notification of Transmittal of the International Search Report and the Written Opinion of the International Searching Authority, or the Declaration, PCT/EP2024/053406, May 6, 2024, pp. 1-12.

(Continued)

*Primary Examiner* — Alexander Lagor
*Assistant Examiner* — Felicia Farrow
(74) *Attorney, Agent, or Firm* — Edward J. Wixted, III, Esq.; Blanche E. Schiller, Esq.; Heslin Rothenberg Farley & Mesiti P.C.

(57) ABSTRACT

An instruction to be executed within the computing environment is obtained. The instruction includes an operation code indicating a diagnose operation. The instruction is executed. The executing includes obtaining a token as an input to the instruction and comparing the token to a current token for a configuration of the computing environment. Based on the token matching the current token, one or more verification certificates are returned from a certificate store.

25 Claims, 16 Drawing Sheets

(56) References Cited

U.S. PATENT DOCUMENTS

| 2012/0317375 | A1* | 12/2012 | Driever | G06F 13/385 |
| | | | | 711/E12.001 |
| 2016/0306976 | A1* | 10/2016 | Gantman | G06F 21/44 |
| 2018/0091313 | A1* | 3/2018 | Li | G06F 9/4403 |
| 2020/0267001 | A1* | 8/2020 | Schwarz | H04L 9/3033 |
| 2021/0232689 | A1 | 7/2021 | Nagayoshi et al. | |

OTHER PUBLICATIONS

IBM, "z/Architecture Principles of Operation," IBM Publication No. SA22-7832-12, Thirteenth Edition, Sep. 2019, 2000 pages.

* cited by examiner

100

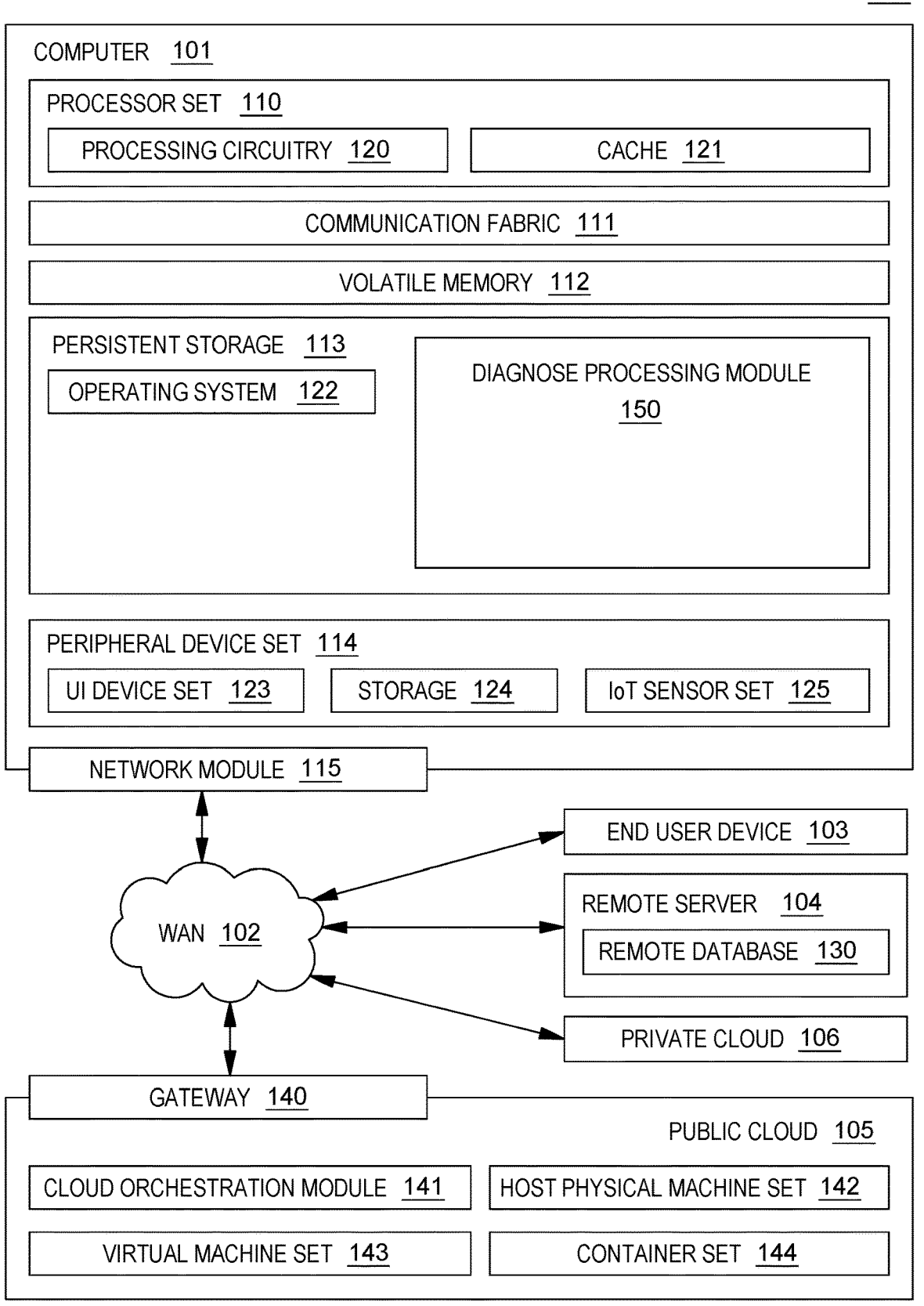

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

DIAGNOSE PROCESSING MODULE
150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143          CONTAINER SET 144

FIG. 1A

PROCESSOR / PROCESSOR UNIT

INSTRUCTION FETCH — 200

INSTRUCTION DECODE
OPERAND FETCH — 202

204

INSTRUCTION EXECUTE

206

MEMORY ACCESS

208

WRITE BACK

210

REGISTER(S)

DIAGNOSE
PROCESSING
MODULE

150

150

310

DIAGNOSE $R_1$, $R_3$, $D_2$ ($B_2$)                    400

| OPCODE | $R_1$ | $R_3$ | $B_2$ | $D_2$ |
|--------|-------|-------|-------|-------|
| 402 | 404 | 406 | 408 | 410 |

404a $R_1$ | FIRST OPERAND ADDRESS
420

404b $R_1 + 1$ | RESPONSE CODE
422

406a $R_3$ | SUBCODE
432

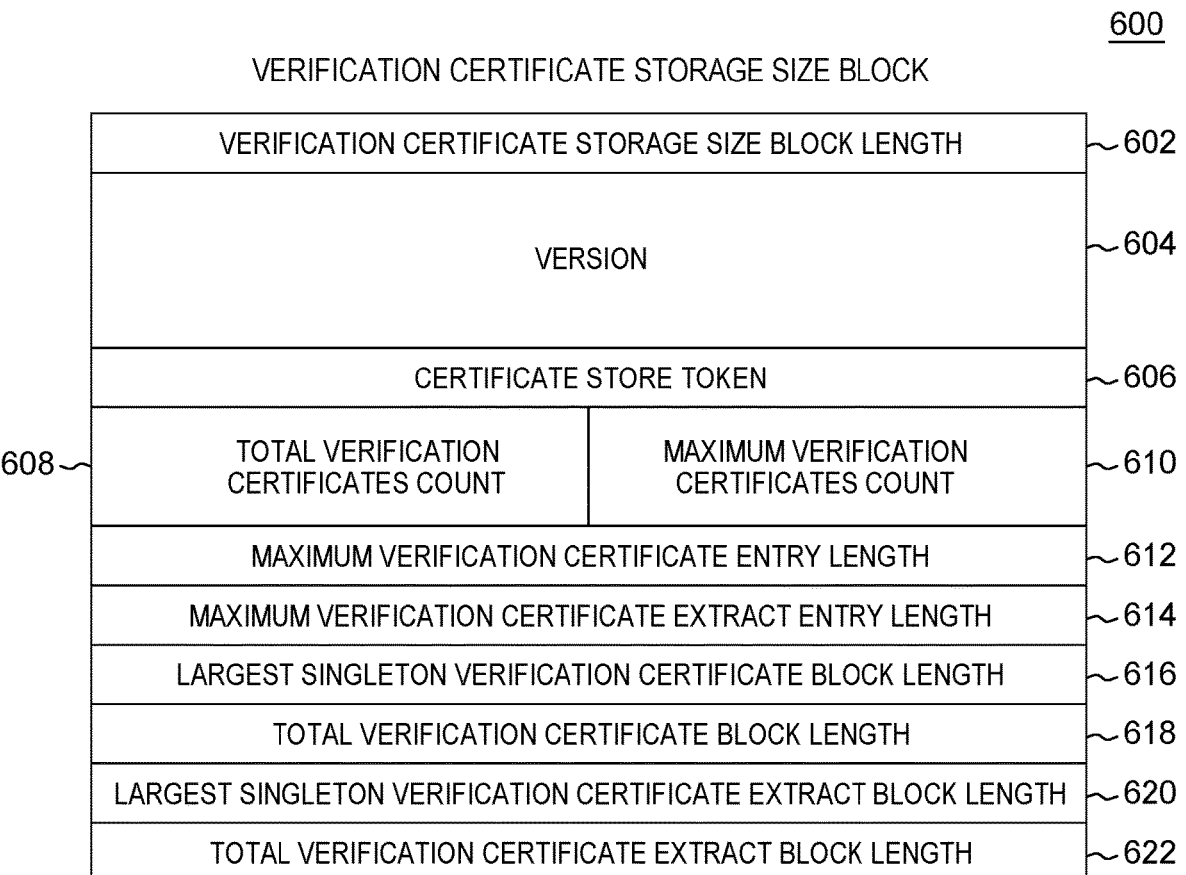

600

VERIFICATION CERTIFICATE STORAGE SIZE BLOCK

| | |
|---|---|
| VERIFICATION CERTIFICATE STORAGE SIZE BLOCK LENGTH | ~602 |
| VERSION | ~604 |
| CERTIFICATE STORE TOKEN | ~606 |
| TOTAL VERIFICATION CERTIFICATES COUNT / MAXIMUM VERIFICATION CERTIFICATES COUNT | ~610 |
| MAXIMUM VERIFICATION CERTIFICATE ENTRY LENGTH | ~612 |
| MAXIMUM VERIFICATION CERTIFICATE EXTRACT ENTRY LENGTH | ~614 |
| LARGEST SINGLETON VERIFICATION CERTIFICATE BLOCK LENGTH | ~616 |
| TOTAL VERIFICATION CERTIFICATE BLOCK LENGTH | ~618 |
| LARGEST SINGLETON VERIFICATION CERTIFICATE EXTRACT BLOCK LENGTH | ~620 |
| TOTAL VERIFICATION CERTIFICATE EXTRACT BLOCK LENGTH | ~622 |

VERIFICATION CERTIFICATE BLOCK

36

DIAGNOSE INSTRUCTION TO EXECUTE VERIFICATION CERTIFICATE RELATED FUNCTIONS

BACKGROUND

One or more aspects relate, in general, to facilitating processing within a computing environment, and in particular, to improving verification certificate processing used during an initial program load within the computing environment.

In one example of performing an initial program load of software, the software is loaded into, for instance, a logical partition. The initial program load is typically a multi-step process, in which, for instance, firmware on the machine performs an initial program load of some of the software, such as a boot loader, that in turn loads in the main program (often an operating system) and then that main program typically in turn loads in additional software packages and programs. Verification that the software loaded during an initial program load and later by the software itself is genuine and unaltered from what the software signer provided is typically performed by validating the software using a public key (contained within a certificate, such as a verification certificate) that corresponds to a private key used by the software signer to sign the software.

In this situation, the verification keys used by both the firmware (to perform the initial program load) and by the software may or may not be same. Also, the signer may change the verification keys used to sign the software over time to protect the verification keys. Therefore, processing associated with the verification process, including use of the verification certificates, is to be facilitated.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes obtaining an instruction to be executed within a computing environment. The instruction includes an operation code indicating a diagnose operation. The instruction is executed. The executing includes obtaining a token as an input to the instruction and comparing the token to a current token for a configuration of the computing environment. Based on the token matching the current token, one or more verification certificates are returned from a certificate store.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1A depicts one example of a computing environment to incorporate and use one or more aspects of the present invention;

FIG. 6 depicts one example of a verification certificate storage size block used in accordance with one or more aspects of the present invention;

DETAILED DESCRIPTION

Figure 1B:
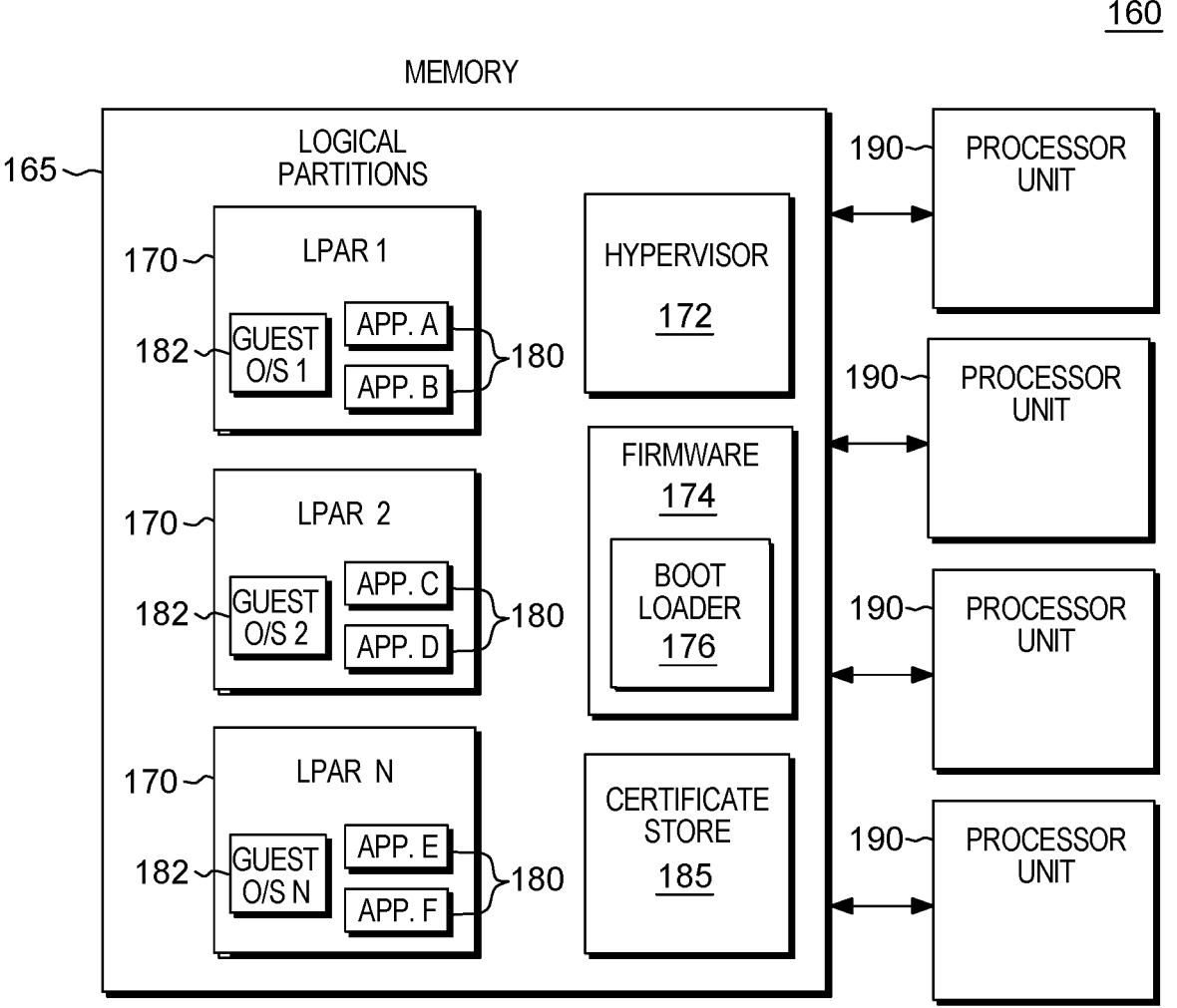
FIG. 1B depicts another example of aspects of a computing environment to incorporate and use one or more aspects of the present invention.

In accordance with one or more aspects of the present invention, a capability is provided to facilitate processing within a computing environment. In one aspect, the capability includes facilitating processing relating to verification certificates used in, for instance, initial program loading of a program (e.g., a boot loader, operating system, etc.). In one example, the capability includes using an instruction (e.g., a single architected instruction) configured to perform one or more functions related to a certificate store facility that stores verification certificates.

In one or more aspects, the instruction is configured to include a plurality of subcodes for a plurality of functions, and a particular subcode is selected for a particular execution of the instruction. One or more operations, based on the selected subcode, are performed in the particular execution of the instruction. The instruction may be issued by a program, including, but not limited to, a boot loader, an operating system, etc. In other embodiments, other programs, entities and/or components may issue the instruction. Many options and/or variations are possible.

In one or more aspects, the instruction is referred to herein as a diagnose instruction, and the processing associated with the instruction, including processing associated with verification certificates, is referred to herein as diagnose processing. The instruction may be used by other programs and/or entities and/or for other purposes. Many variations and options are possible.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., performs diagnose processing (including execution of selected subcodes of a diagnose instruction) and/or one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1A. In one example, a computing environment 100 contains an example of an environment for the execution of at least some of the computer code involved in performing the inventive methods, such as diagnose processing code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1A. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1A are not included in the computing environment and/or are not used for one or more aspects of the present invention. Further, in one or more embodiments, additional and/or other components/modules may be used. Other variations are possible.

Another example of aspects of a computing environment to incorporate, use and/or perform one or more aspects of the present invention is described with reference to FIG. 1B. In one example, a computing environment 160 supports logical partitioning, and includes, for instance, a memory 165 (a.k.a., system memory, main memory, main storage, central storage, storage; e.g., persistent storage, such as persistent storage 113; other storage; etc.) coupled to one or more processor units 190 (e.g., central processing units (CPUs), other types of processors, etc.) of, e.g., a processor set (e.g. processor set 110).

Memory 165 includes, for example, one or more logical partitions 170, a logical partition manager, such as a hypervisor 172, firmware 174, and, in accordance with one or more aspects of the present invention, a certificate store 185 (which is further described below). One example of hypervisor 172 is an IBMR PR/SM™ (Processor Resource/System Manager) logical partition manager, offered by International Business Machines Corporation, Armonk, New York. IBM and PR/SM are trademarks or registered trademarks of International Business Machines Corporation in at least one jurisdiction. Other hypervisors and/or managers may be used in other examples.

Logical partitioning support provides the ability to operate large numbers of logical partitions 170, each capable of operating with different programs 180 and running a guest operating system 182. Each logical partition 170 is capable of functioning as a separate system. That is, each logical partition can be independently reset, run a guest operating system, and operate with different programs. An operating system or application program running in a logical partition appears to have access to a full and complete system, but in reality, only a portion of it is available.

In one example, a logical partition 170 includes one or more logical processors, each of which represents all or a share of a physical processor resource (e.g., processor unit 190) that may be dynamically allocated to the logical partition.

Firmware 174 includes, e.g., the microcode of the processor and/or of the system. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

In one example, firmware 174 includes a boot loader 176 used in initial program loading (IPL) of a selected program, such as an operating system. Initial program loading provides a mechanism for causing a program (e.g., a boot loader, an operating system) to be read from a designated device and for initiating the execution of that program. In one or more embodiments, the boot loader code (also referred to as a boot loader, e.g., boot loader 176) is loaded, copied or otherwise exists in firmware and is used in performing an initial program load of a program (e.g., an operating system). One particular type of initial program load is a list-directed initial program load, which allows a program (e.g., an operating system) to be loaded from various types of input/output devices.

Figure 2:
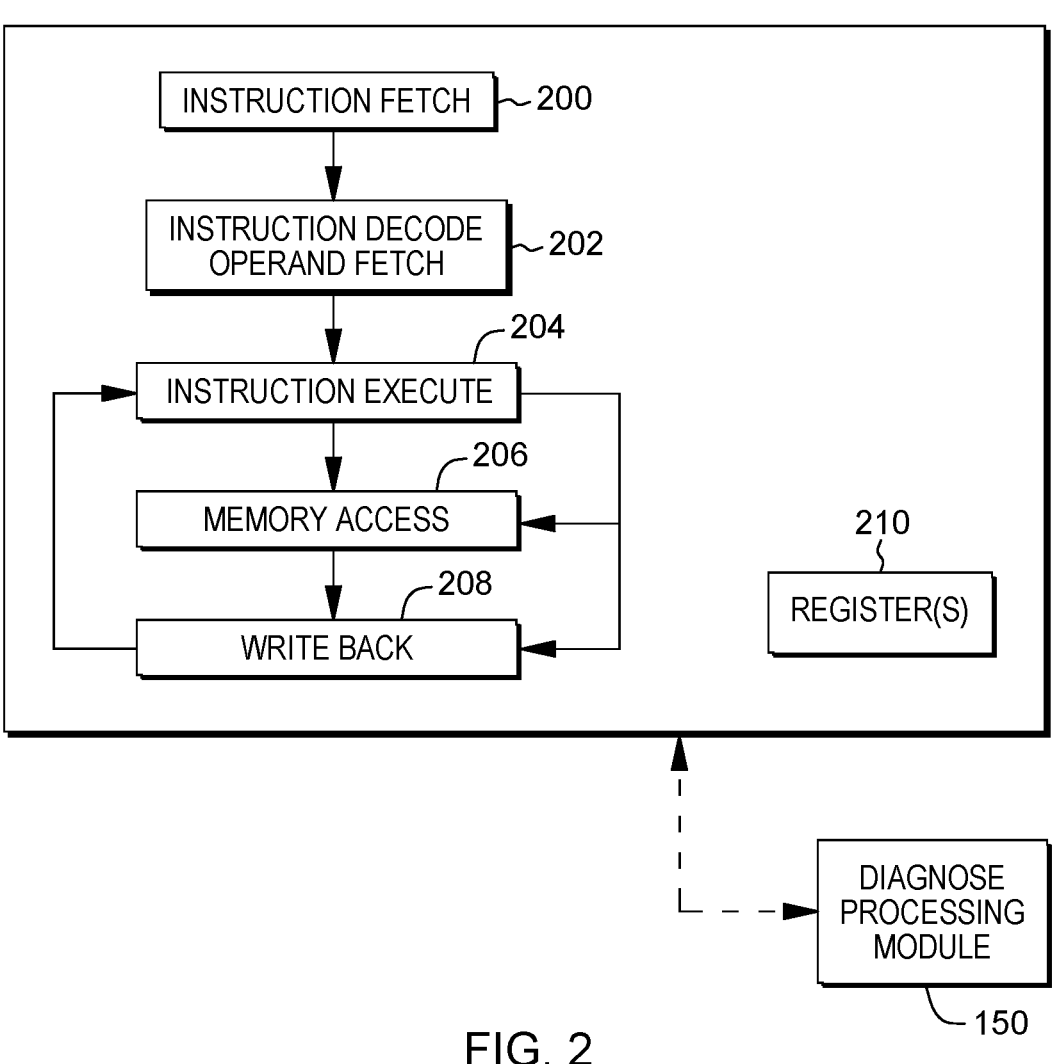
FIG. 2 depicts one example of further details of a processor or processor unit, in accordance with one or more aspects of the present invention.

Programs loaded by initial program load, or otherwise initiated, execute instructions to perform operations within the computing environment. To execute the instructions, in one example, functional components of, e.g., a processor unit or processor (e.g., of processor set 110), are used. One example of functional components used to execute instructions is described with reference to FIG. 2. In one example, functional components used to execute instructions include, for instance, an instruction fetch component 200 to fetch instructions to be executed; an instruction decode/operand fetch component 202 to decode the fetched instructions and to obtain operands of the decoded instructions; one or more instruction execute components 204 to execute the decoded instructions; a memory access component 206 to access memory for instruction execution, if necessary; and a write back component 208 to provide the results of the executed instructions. One or more of the components may access and/or use one or more registers 210 in instruction processing. Further, one or more of the components may access and/or use diagnose processing module 150. Additional, fewer and/or other components may be used in one or more aspects of the present invention.

A diagnose processing module (e.g., diagnose processing module 150) includes code or instructions used to perform diagnose processing, in accordance with one or more aspects of the present invention. A diagnose processing module (e.g., diagnose processing module 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and the computer readable program code may be executed by and/or using one or more computing devices (e.g., one or more computers, such as computer(s) 101; one or more servers, such as remote server(s) 104; one or more processors, such as a processor unit or processor of processor set 110; processing circuitry, such as processing circuitry 120 of processor set 110; and/or other computing devices, etc.). Additional, fewer and/or other computers, servers, processors, processor units, processing circuitry and/or computing devices may be used to execute one or more of the sub-modules and/or portions thereof. Many examples are possible.

Figure 3A:
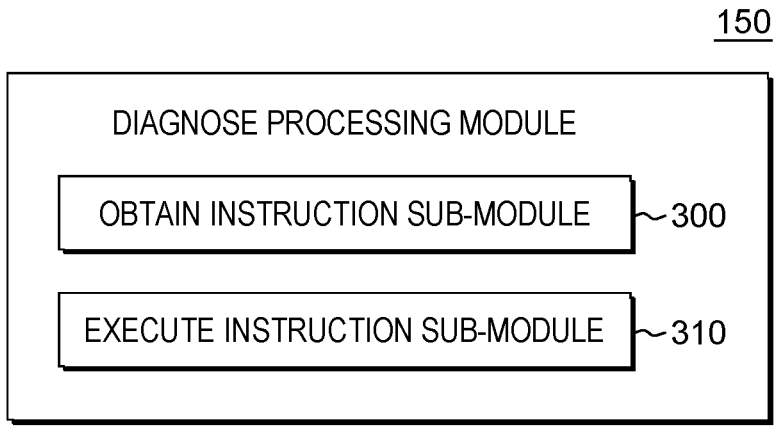
FIG. 3A depicts one example of sub-modules of a diagnose processing module of, e.g., FIG. 1A, in accordance with one or more aspects of the present invention.

One example of diagnose processing module 150 is described with reference to FIG. 3A. In one example, diagnose processing module 150 includes an obtain instruction sub-module 300 to obtain (e.g., receive, be provided, pull, retrieve, fetch, be issued, etc.) a diagnose instruction to be executed, and an execute instruction sub-module 310 to be used to execute the diagnose instruction.

Figure 3B:
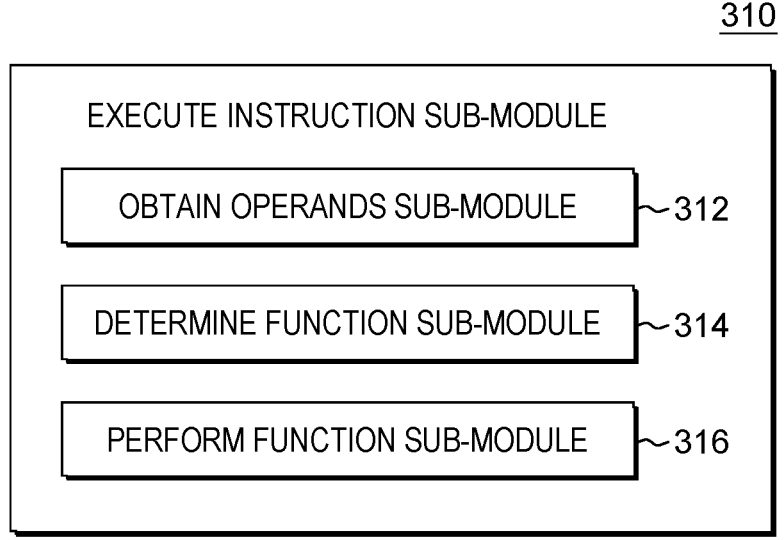
FIG. 3B depicts one example of sub-modules of the execute instruction sub-module of FIG. 3A, in accordance with one or more aspects of the present invention.

In one example, referring to FIG. 3B, execute instruction sub-module 310 includes, for instance, an obtain operands sub-module 312 to obtain one or more operands of the diagnose instruction; a determine function sub-module 314 to determine the function to be performed by the diagnose instruction; and a perform function sub-module 316 to perform the determined function. Additional, fewer and/or other sub-modules may be used to implement the diagnose processing, including execution of a diagnose instruction and/or other processing associated therewith.

One example of a diagnose instruction is described with reference to FIG. 4A. In one embodiment, a diagnose instruction, such as a Diagnose instruction 400 (also referred to, in one particular architecture, as Diagnose '0320'), is a single architected hardware machine instruction at the hardware/software interface. It is configured to include a plurality of subcodes and a particular subcode is indicated in an invocation of the instruction. Performance of each subcode includes performing one or more operations as part of execution of the diagnose instruction specifying the subcode.

As an example, the diagnose instruction, in one implementation, is part of an instruction set architecture. One example of an instruction set architecture to incorporate and/or use a diagnose instruction and/or aspects of the present invention is the IBM® z/Architecture® instruction set architecture offered by International Business Machines Corporation, Armonk, New York. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present invention. z/Architecture is a trademark or registered trademark of International Business Machines Corporation in at least one jurisdiction.

In one example, Diagnose instruction 400 has a format, referred to as a register and storage operand format, having, e.g., 32 bits. In this particular example, Diagnose instruction 400 has an operation code (e.g., opcode) field 402 (e.g., bits 0-7) specifying a diagnose operation; one register (e.g., $R_1$) field 404 (e.g., bits 8-11) specifying at least one general purpose register used in execution of the Diagnose instruction; another register (e.g., $R_3$) field 406 (e.g., bits 12-15) specifying at least one general purpose register used in execution of the Diagnose instruction; a base register field (e.g., $B_2$) 408 (e.g., bits 16-19) specifying a base register; and a displacement (e.g., $D_2$) field 410 (e.g., bits 20-31) specifying a displacement value which is added to a value in a base register specified in base register field 408 to provide a value to be used as an operation code extension for the Diagnose instruction 400. Each of the fields is described below.

In one example of Diagnose instruction 400, contents of $D_2$ field 410 are added to the contents of a general register specified in $B_2$ field 408. The result is not used to address data; instead, selected bits (e.g., bits 0-47) are ignored and other selected bits (e.g., bits 48-63) are used as an operation code extension. When the operation code extension is a selected operation code (e.g., '0320' hex), one or more certificate store functions are performed.

In one embodiment, $R_1$ field 404 is to designate an even register of an even-odd pair of general registers; otherwise, a specification exception is recognized, in one example. The $R_1+1$ field designates the odd register of the even-odd pair. In one example, referring to FIG. 4B, contents 404a of general register $R_1$ designate, for instance, a first operand address 420. For instance, general register $R_1$ designates a logical address in storage where the specified certificate store (CS) function information for the current configuration (e.g., for a guest, such as a guest operating system (e.g., guest operating system 182) and/or other guests) is to be stored. The logical address is generated under the control of the current addressing mode. In one example, in the access-register mode, access register $R_1$ specifies the address space containing the response block. Other examples are possible. The locations at the specified logical address are to be accessible throughout the execution of the Diagnose instruction. When dynamic address translation (DAT) is on, address translation may be performed on one 4-K byte page (or other selected size) at a time, and the resulting frame may be accessed without interlocking with DAT-serializing operations (such as invalid page table entry) on other processors. If an access exception occurs while storing into any part of the response buffer, the contents of any accessible portion of the response buffer are unpredictable, even if the exception is defined to suppress or nullify execution of the instruction.

In one example, prior to invoking Diagnose '0320', the operating system may "pin" the storage area(s) addressed by the contents of general register $R_1$ to prevent invalidation of the translation by memory management on another processor. In one example, if virtual addressing is used, the Diagnose '0320' instruction performs dynamic address translation prior to accessing a page, but subsequent stores to the page are not interlocked with invalid page table entries from other processors. Thus, the Diagnose instruction could continue to store into the page frame even after memory management on another processor has reassigned it.

Figures 4A, 4B, 4C, 4D:
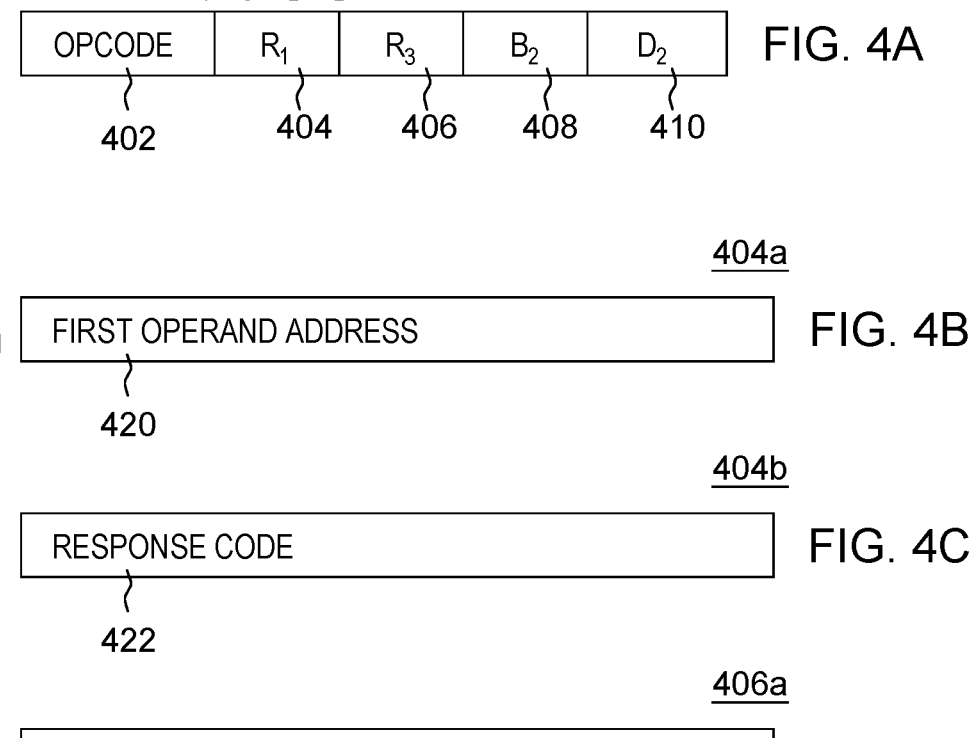
FIG. 4A depicts one example of a format of a diagnose instruction, in accordance with one or more aspects of the present invention.
FIGS. 4B-4C depict one example of fields of a register pair used by one example execution of the diagnose instruction of FIG. 4A, in accordance with one or more aspects of the present invention.
FIG. 4D depicts one example of fields of a register used by one example execution of the diagnose instruction of FIG. 4A, in accordance with one or more aspects of the present invention.

In one example, referring to FIG. 4C, a response code 422 is returned in, e.g., bit positions 48-63 of contents 404b of general register $R_1+1$. As examples, a response code of, e.g., 0001 hex indicates that the operation completed successfully, and response code of 0102 hex indicates that the subcode is not supported on this model. Other response codes/response code values are possible.

Further, in one example, referring to FIG. 4D, contents 406a (e.g., bits 56-63) of general register $R_3$ include a subcode 432 (e.g., 8-bit unsigned integer) that determines the specific function to be performed by the diagnose instruction. Example subcodes include, for instance, subcode 0—Query installed subcodes to be used to determine the subcodes supported by Diagnose '0320'; subcode 1—Query verification certificate storage information; subcode 2—Store verification certificates; and subcode 3—Store verification certificate extracts. Additional, fewer and/or other subcodes may be provided.

In one embodiment, the fields of the instruction are separate and independent from one another; however, in other embodiments, more than one field may be combined. Further, a field may be extended to more than one location. For instance, a field, may be in one set of bits and extend to another set of bits separate from the one set of bits (e.g., in the beginning of the instruction format and at the end of the instruction format; and/or variations thereof). Although example types of registers are specified, other types of registers may be used. Moreover, although example locations within the instruction format are provided, other locations may be used for one or more of the instruction fields.

A diagnose instruction, such as Diagnose instruction 400, may have additional, fewer and/or other fields. Other examples are possible.

Further, in the description herein of a diagnose instruction, such as Diagnose instruction 400, specific locations, specific fields and/or specific sizes of the fields may be indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

If a field has a subscript number associated therewith, the subscript number associated with the field denotes the operand to which the field applies. For instance, subscript number 1 associated with register $R_1$ denotes that the register(s) specified using $R_1$ includes the first operand, subscript number 2 associated with base register $B_2$ and $D_2$ denotes a second operand, and so forth.

In one example, a diagnose instruction (e.g., Diagnose instruction 400 with the selected operation code extension (e.g., '0320' hex)) provides various functions associated with a certificate store (CS) facility. For instance, it obtains current verification certificate information from the certificate store (e.g., certificate store 185) for the requesting configuration (e.g., for a guest, such as a guest operating system (e.g., guest operating system 182) and/or other guests) and returns the certificate information to the program. The verification certificates are validated before placing them into the certificate store.

In one example, the certificate store (e.g., certificate store 185), which is used to manage certificates (e.g., verification certificates) dynamically, manages the certificates for the one or more configurations (e.g., guests) at a particular guest or configuration level. For instance, there may be multiple levels of guests, e.g., one level of guest that runs under one level of hypervisor (e.g., a logical partition hypervisor (e.g., hypervisor 172)) and another level of guest that runs under another level of hypervisor (e.g., an IBM® z/VM® hypervisor or another hypervisor offered by International Business Machines Corporation and/or other companies/entities. z/VM is a trademark or registered trademark of International Business Machines Corporation in at least one jurisdiction. Other hypervisors and/or managers may be used in other examples.). In this example, the same certificate store is used for each configuration level. That is, in one example, each configuration level has its own machine (e.g., central electronic complex) certificate store. In other examples, it is common for multiple configuration levels. In other examples, each configuration (or a subset of configurations) has its own certificate store. In another example, each hypervisor has its own certificate store. Other variations are possible.

In one or more aspects, new certificates can be added to the certificate store and old certificates can be deleted from the certificate store dynamically anytime. In one example, each time a certificate is added or deleted, the certificate store token is updated with a new unique value. If a counter is used, the counter is incremented, even when a certificate is deleted (it is not, in this example, a count of certificates currently in the certificate store). If a counter is not used, a new unique value is to be used until the entire set of possible values are used to prevent the user from seeing a duplicate value for two or more versions of the same certificate store for the configuration. If there is more than one logical system (e.g., configuration level), each certificate store for each logical system is to adhere to these rules. As a result, each certificate store may use its own certificate store token value generation scheme. Therefore, each certificate store may return a different certificate store token value for each configuration at any given time. Other variations are possible.

In one example, the verification certificates for a given configuration are stored in a verification certificate block (VCB). They are indexed from one to N, in one example. However, not every verification certificate in the indexed list necessarily contains a valid certificate (i.e., there can be indexed entries not marked valid).

In one example, the certificate store also maintains specific material, as an example extracted from the verification certificates for specific key types, such as elliptic-curve keys. The set of extracted key type material for a verification certificate is called a verification certificate extract (VCX). The verification certificate extracts are stored separately, in one example, in a verification certificate extract block (VCXB). (In other examples, they may be stored with the verification certificates. Various possibilities exist.) The verification certificate extracts for a configuration are indexed from one to N, in one example; for a configuration, the index of a verification certificate extract is the same as the index of the verification certificate from which specific material is extracted. That is, $VCX_X$ corresponds to $VC_X$. However, not every verification certificate extract in the indexed list may contain a valid verification key (i.e., there can be indexed entries which do not contain a valid verification key).

In one example, the verification certificates and the verification certificate extracts maintained in the certificate store are obtained and stored by executing, for instance, an instruction, such as Diagnose '320'. A deleted or expired verification certificate is indicated as an invalid verification certificate in its respective control block entry. When a verification certificate is invalid, its corresponding verification certificate extract is also invalid, in one example.

When the verification certificate is valid and includes a key of a key type for which the verification certificate extract format is supported, then the corresponding verification certificate extract is valid also. Accordingly, a valid verification certificate may not imply a valid verification certificate extract.

In one example, a certificate store (CS) token value is used to represent a current version of the list of verification certificates and their corresponding verification certificate extracts that are available in the certificate store for the configuration (e.g., for a guest, such as a guest operating system (e.g., guest operating system 182) and/or other guests). The value in this field is to change when changes occur within the certificate store for the configuration. The value is updated, for instance, each time one or more verification certificates and their corresponding verification certificate extracts are added, deleted, or modified.

A certificate store token value is not updated, in one example, while a certificate store function is being executed. In one example, the list of verification certificates and the corresponding list of verification certificate extracts is not to be added to, deleted from, or modified in the certificate store for the configuration until the execution of currently running Diagnose '0320' functions complete. Similarly, a subsequent Diagnose '0320' function is not to be started while verification certificates and corresponding verification certificate extracts are being updated for the configuration.

In one example, a certificate store token value is not to be re-used until each certificate store token value has been used. Other variations are possible.

Further, in one example, the program (e.g., boot loader, operating system) is to ensure that upon finding the certificate store token value has changed for the configuration, the relevant information obtained from the certificate store for any prior configuration is to be re-evaluated. This includes maximums and largest values, described herein. Moreover, in one example, indexing for the certificate store has a one origin. Requests which include a certificate with an index of zero provide the indication that there is no certificate available for that index.

As indicated, in one embodiment, the Diagnose instruction implements a plurality of subcodes, three of which are described herein, in accordance with one or more aspects of the present invention. These subcodes are referred to as, for instance, subcode 1—Query verification certificate storage information; subcode 2—Store verification certificates; and subcode 3—Store verification certificate extracts; however, they may be referred to in other ways. Each of the subcodes is further described below.

Subcode 1—Query Verification Certificate Storage Information

In one or more aspects, a program (e.g., a boot loader, an operating system, other programs, etc.) may use Diagnose '0320' subcode 1 to obtain the certificate store information to find the current version number of the certificate store for the current configuration and to determine the amount of storage to be used to store one or more verification certificates (VCs) and/or their corresponding verification certificate extracts (VCXs) from the certificate store for the current configuration.

In one embodiment, subcode 1 returns various storage sizes specific to, e.g., verification certificate blocks (VCBs) and verification certificate extract blocks (VCXBs).

If verification certificates do not exist for the configuration, a verification certificate storage size block (VCSSB) length is set to a defined value, e.g., 4, and a response code 422 of, e.g., 0001 hex is returned in, e.g., bit positions 48-63 of general register $R_1+1$.

In one example, Diagnose '0320' subcode 1 is valid when a certificate store (CS) facility is installed in one particular architecture and architectural mode (e.g., z/Architecture instruction set architecture in architectural mode). This check may not be performed for other architectures and/or other architectures may perform other checks. Many possibilities exist.

In one example, the first operand is to be designated on a doubleword boundary; otherwise, a specification exception is recognized, in one example. Further, in one example, output data returned by Diagnose '0320' subcode 1 when the operation completes successfully is stored in, for instance, a verification certificate storage size block (VCSSB), an example of which is described below.

In operation, in one example, subcode 1 (i.e., e.g., execution of Diagnose instruction 400 with subcode 432 set to 1) obtains certificate store information to find the current version number of the certificate store for the current configuration and to determine the amount of storage to be used to store one or more verification certificates and/or their corresponding verification certificate extracts from the certificate store for the current configuration.

It obtains, in one example, a consistent set of information about how many verification certificates and/or verification certificate extracts are to be provided by subsequent issuances of Diagnose '0320' instructions, along with storage requirements to retrieve these certificate materials in either an all at once manner or an incremental, one or more at a time manner (to conserve on memory requirements), at the discretion of the program.

Diagnose '0320' subcode 1 returns, in one example, information to satisfy different operating system implementations by providing, for instance, a largest singleton verification certificate block/verification certificate extract block length to determine a minimum number of data units, e.g., bytes to be used to obtain a verification certificate block/ verification certificate extract block with at least one verification certificate block/verification certificate extract block entry that is currently available in the certificate store for the current configuration; providing a total verification certificate block/verification certificate extract block length for the current configuration to determine a minimum number of, e.g., bytes to be used to obtain a verification certificate block/verification certificate extract block with, e.g., all the verification certificate block/verification certificate extract block entries that are currently available in the certificate store for the current configuration; and/or providing the number of, e.g., bytes to be used to contain the maximum number of verification certificate entries/verification certificate extract entries that are supported by the current machine model where the software is running. For instance, the maximum number of verification certificate entries/verification certificate extract entries are provided that are supported by the current model of the central electronic complex (CEC) that includes the logical partitions that are executing the software.

In one or more aspects, the hypervisor ensures that the program does not see updated results while it is gathering the certification certificates list and/or the certification certificate extracts list for the current configuration across issuances of multiple instances of the Diagnose '0320' instruction. The operating system, as an example, does not have to consistency check the returned information across these multiple issuances; any information that is successfully returned includes a consistent set of information.

In accordance with one or more aspects of the present invention, diagnose processing, including execution of a diagnose instruction, such as Diagnose instruction 400, is performed using a diagnose process. Examples of such a process are described with reference to FIGS. 5A-5D. In one example, a diagnose process (e.g., a diagnose process 500) may be implemented using one or more sub-modules (e.g., one or more of sub-modules 300-316) and is executed by one or more computing devices (e.g., one or more computers (e.g., computer(s) 101, other computer(s), etc.), one or more servers (e.g., server(s) 104, other server(s), etc.), one or more processor(s), processor unit(s), node(s) and/or processing circuitry, etc. (e.g., of processor set 110 or other processor sets), and/or other computing devices, etc.). Although example computing devices, computers, servers, processors, processor units, nodes and/or processing circuitry are provided, additional, fewer and/or other computers, servers, processors, processor units, nodes, processing circuitry and/or computing devices may be used for the diagnose process and/or other processing. Various options are possible.

Figure 5A:
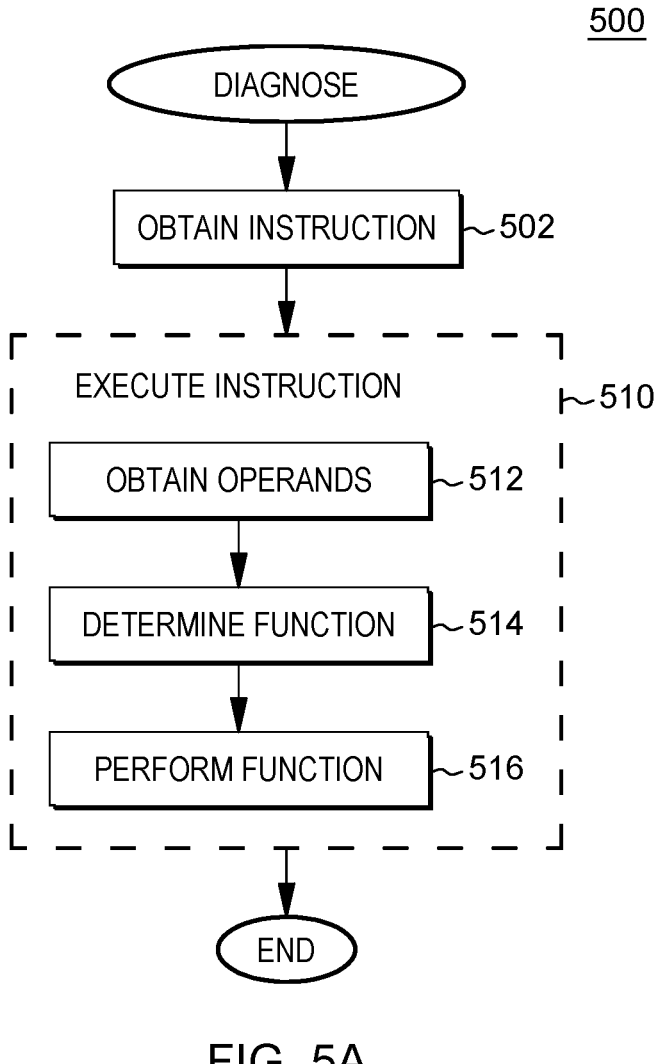
FIG. 5A depicts one example of diagnose instruction processing, in accordance with one or more aspects of the present invention.

Referring to FIG. 5A, in one example, a diagnose process 500 obtains 502 (e.g., receives, retrieves, fetches, is provided, pulls, is issued, etc.) an instruction, such as Diagnose instruction 400. For instance, in one example, the program (e.g., boot loader or the operating system) issues the Diagnose '0320' instruction specifying subcode 1 (Query Verification Certificate Storage Information) to obtain specific storage information for the current configuration to determine the amount of storage to be used to store one or more verification certificates and/or their corresponding verification certificate extracts that are in the certificate store for the current configuration. These data blocks are used, for instance, to validate the signed load modules (binary codes). Based on issuance of the instruction by the program, process 500 obtains the instruction and executes 510 the instruction, e.g., via a hypervisor (e.g., hypervisor 172). Execution includes, for instance, obtaining 512 one or more operands of the instruction. As examples, process 500 obtains one or more of: an operation code using opcode field 402, a subcode 432 using $R_3$ field 406, and a first operand address 420 using $R_1$ field 404. In one or more embodiments, additional, fewer and/or other operands may be used. Many variations are possible.

Based on obtaining the operands, in one example, process 500 determines 514 the function to be performed (e.g., as specified, e.g., by subcode 432). In one example, the function is a Query Verification Certificate Storage Information function specified by subcode 1. However, additional, fewer and/or other functions may be specified. Further, in other embodiments, a subcode is not specified, and instead, the function is determined from another field of the instruction, such as one or more opcode fields, one or more other fields; or it is implied, etc. Many variations are possible.

In one example, based on determining the function, process 500 performs 516 the function. As an example, a hypervisor (e.g., hypervisor 172) performs the function, including one or more operations of the function. In other examples, other entities, components, etc. may perform one or more of the functions and/or one or more operations of a function. Many variations are possible.

Figure 5B:
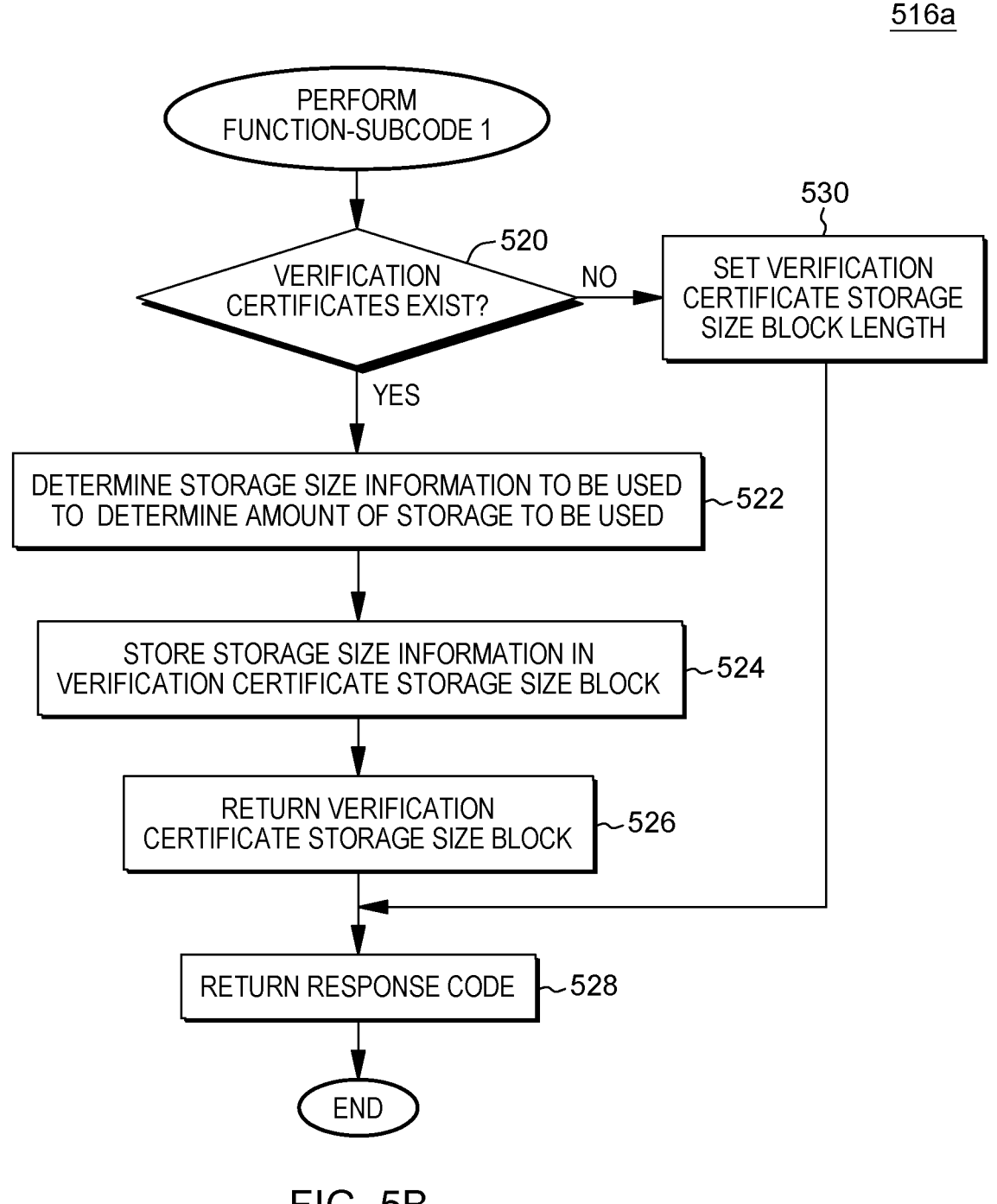
FIG. 5B depicts one example of further details of the performing a function of FIG. 5A, in accordance with one or more aspects of the present invention.
Figure 5C:
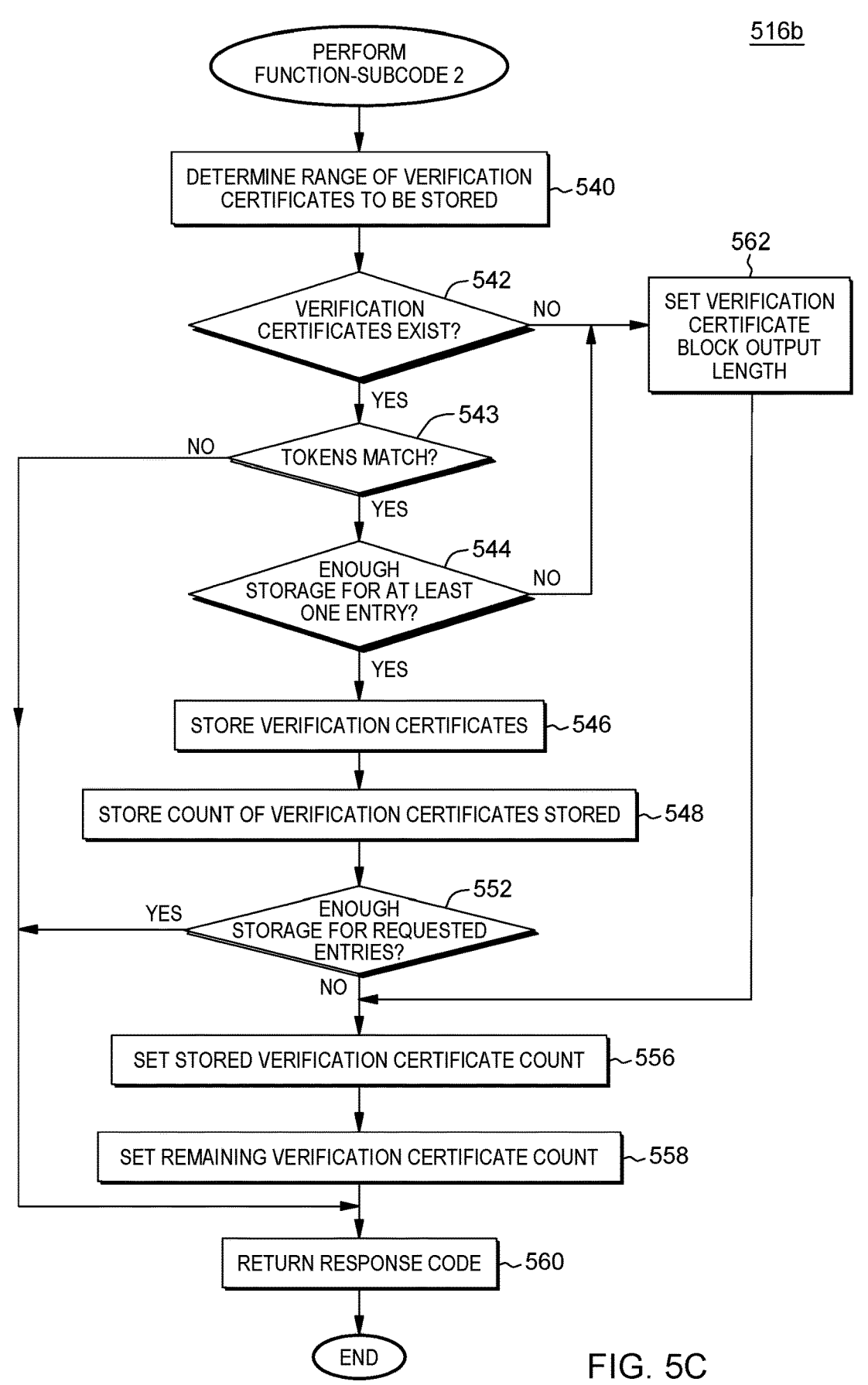
FIG. 5C depicts another example of further details of the performing a function of FIG. 5A, in accordance with one or more aspects of the present invention.
Figure 5D:
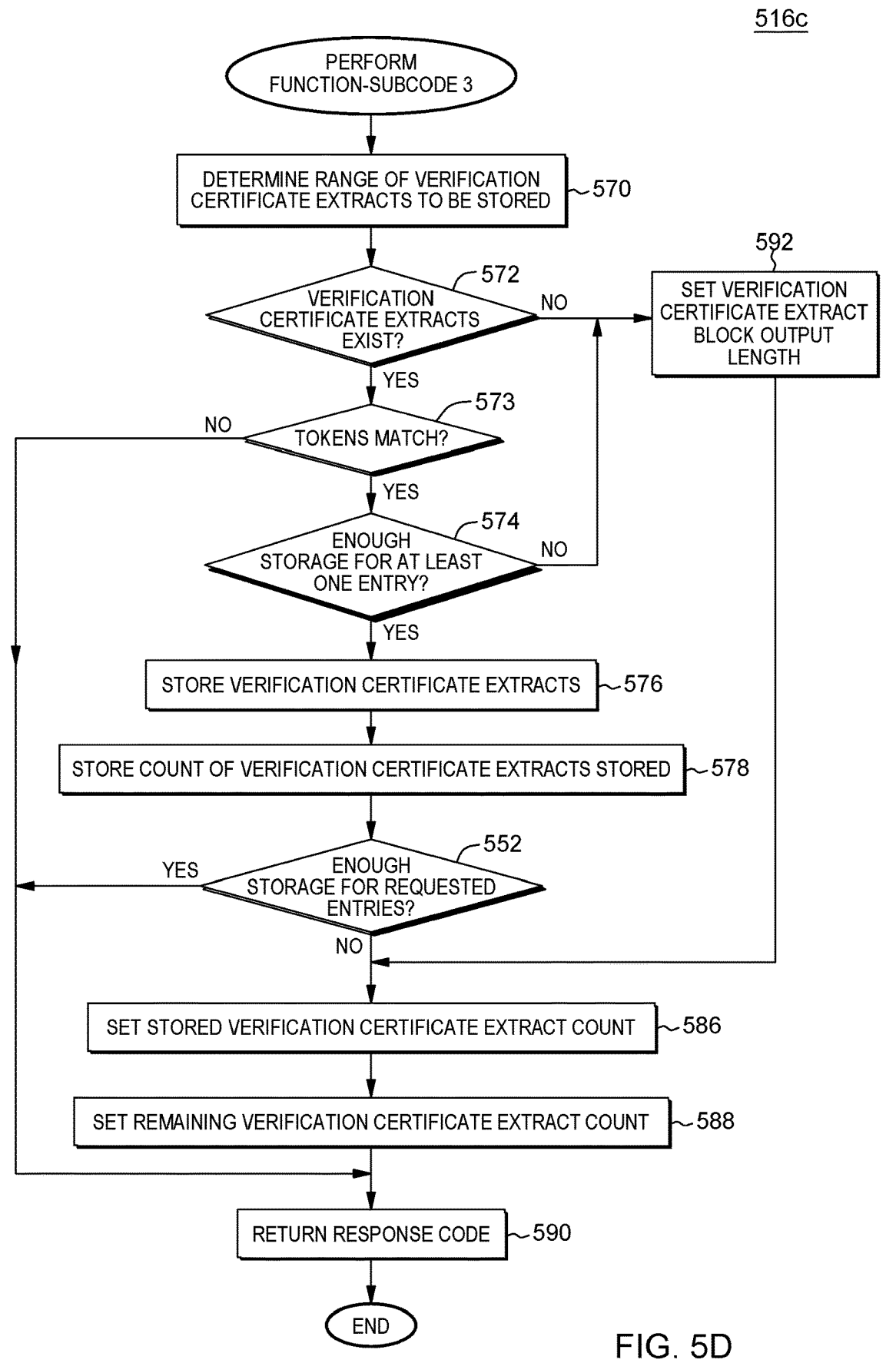
FIG. 5D depicts another example of further details of the performing a function of FIG. 5A, in accordance with one or more aspects of the present invention.

Further details relating to one example of performing the function (e.g., the Query Verification Certificate Storage Information-Subcode 1) are described with reference to FIG. 5B.

In one embodiment, a process 516a performs a query to obtain storage information to be used to determine the amount of storage to be used to store one or more verification certificates and/or corresponding verification certificate extracts. Process 516a determines 520, for instance, whether any verification certificates exist in the certificate store for the requesting configuration. Should there be one or more verification certificates in the certificate store for the requesting configuration, a determination 522 is made of storage size information to be provided to be used to determine the amount of storage to be used to store selected verification certificates and/or their corresponding extracts.

Based on the determination of the storage size information to be provided, process 516a stores various storage size information in an information or control block, such as a verification certificate storage size block, an example of which is described with reference to FIG. 6. For instance, a count of verification certificates available in the certificate store for the configuration, a number of bytes of the largest possible verification certificate entry that can be stored in the certificate store for the configuration, and a number of bytes of the largest possible verification certificate extract entry that can be stored in the certificate store for the configuration are provided. Additional, fewer and/or other storage size information may be provided.

One example of a verification certificate storage size block is described with reference to FIG. 6. In one example, a verification certificate storage size block (VCSSB) 600 includes:

Verification Certificate Storage Size Block Length 602: This field (e.g., word 0) includes, e.g., an unsigned binary integer (e.g., 32-bit) specifying the number of bytes in verification certificate storage size block 600. This field is to be set, in one example, to a minimum of, e.g., 128 by the program; otherwise, a response code 422 of, e.g., 0202 hex is returned in, e.g., bit positions 48-63 of general register $R_1$+1. If verification certificates do not exist for the configuration, the verification certificate storage size block length is set to a defined value, e.g., 4, by the machine (e.g., hypervisor) and a response code 422 of, e.g., 0001 hex is returned in, e.g., bit positions 48-63 of general register $R_1$+1. Other response codes/response code values may be returned.

Version 604: This field (e.g., byte 3 of word 1) includes, e.g., an unsigned binary integer (e.g., 8-bit) specifying a version number for the verification certificate storage size block. This field is set to, e.g., zero.

Certificate Store (CS) Token 606: This field (e.g., word 4) includes, e.g., an unsigned binary integer (e.g., 32-bit) specifying a current version of the certificate store for the configuration (e.g., for a guest, such as a guest operating system (e.g., guest operating system 182) and/or other guests). In one example, the hypervisor obtains this information from, e.g., a count (such as a current token) associated with the certificate store for the configuration.

In one or more aspects, a same (common) certificate store version (e.g., certificate store token) is used for the configuration (e.g., guests) at a particular configuration (e.g., guest) level. Thus, in one example, each hypervisor uses its own certificate store version (CS token) values, and therefore, one level of hypervisor may have a different certificate store token value than another level of hypervisor. In other examples, they may have the same token value and/or each configuration may have its own token value. Other variations are possible.

Total Verification Certificates Count 608: This field (e.g., bytes 0-1 of word 8) include an unsigned binary integer (e.g., 16-bit) specifying a count of verification certificates available in the certificate store for the configuration. The count includes, in one example, available verification certificate indexes, regardless of the validity state of the contained verification certificates.

Maximum Verification Certificates Count 610: This field (e.g., bytes 2-3 of word 8) includes an unsigned binary integer (e.g., 16-bit) specifying a maximum count of verification certificates that can possibly be stored in the certificate store for the configuration.

Maximum Verification Certificate Entry Length 612: This field (e.g., word 16) includes an unsigned binary integer (e.g., 32-bit) specifying a number of bytes of the largest possible verification certificate entry (VCE) that can be stored in the certificate store for the configuration.

Maximum Verification Certificate Extract Entry Length 614: This field (e.g., word 17) includes an unsigned binary integer (e.g., 32-bit) specifying a number of bytes of the largest possible verification certificate extract entry (VCXE) that can be stored in the certificate store for the configuration.

Largest Singleton Verification Certificate Block Length 616: This field (e.g., word 20) includes an unsigned binary integer (e.g., 32-bit) specifying a number of bytes in the verification certificate block with the largest single verification certificate entry that is currently available in the certificate store for the configuration.

Total Verification Certificate Block Length 618: This field (e.g., word 21) includes an unsigned binary integer (e.g., 32-bit) specifying a total number of bytes to be used to store a verification certificate block with the verification certificate block entries that are currently available in the certificate store for the configuration.

Largest Singleton Verification Certificate Extract Block Length 620: This field (e.g., word 22) includes an unsigned binary integer (e.g., 32-bit) specifying a number of bytes in the verification certificate extract block with the largest single verification certificate extract entry that is currently available in the certificate store for the configuration.

Total Verification Certificate Extract Block Length 622: This field (e.g., word 23) includes an unsigned binary integer (e.g., 32-bit) specifying a total number of bytes in a verification certificate extract block with the verification certificate extract block entries that are currently available in the certificate store for the configuration.

In one example, the maximums and largest values that are provided for the certificate store with subcode 1 may change with a change in the current configuration indicated by a change in the certificate store token value. Other variations are possible.

Returning to FIG. 5B, based on storing the storage size information in verification certificate storage size block 600 (or another information or control block), process 516a returns 526 the verification certificate storage size block, assuming subcode 1 completes successfully. Further, in one example, process 516a returns 528 a response code 422 in, e.g., register $R_1$+1. For instance, response code '0001' hex is returned if the subcode completed successfully. Other response codes may also be returned, examples of which are described herein.

Returning to inquiry 520, if it is determined that there are no verification certificates in the certificate store, process 516a sets verification certificate storage size block length 602 to a defined value, such as 4. Further, in one example, process 516a returns 528 a response code 422 in, e.g., register $R_1$+1. For instance, response code '0001' hex is returned. Other response codes may also be returned.

In one or more aspects, the Diagnose '0320' instruction provides a mechanism to obtain verification certificates and/or verification certificate extracts for a given version of the certificate store for the current configuration. In one example, subcode 1 returns to the program the certificate store token value which represents the current version of the certificate store for the current configuration. The program saves the returned certificate store token value and provides it as an input certificate store token value to other functions (subcode 2 and 3, for example). The hypervisor returns, in one example, a certificate store token error response code if the current certificate store token is different than the input certificate store value for other functions. If the hypervisor returns a certificate store token error response code, the program restarts the above process to obtain the respective control blocks again to ensure that the certificate store token value is consistent for the respective control blocks it obtained from the certificate store for the current configuration. This mechanism allows the hypervisor to ensure that the verification certificates list and/or the verification certificate extracts list for this configuration did not change while retrieving them using subsequent and different Diagnose '0320' functions asynchronously.

In one or more aspects, the hypervisor serializes Diagnose '0320' execution and certificate store updates such that the current certificate store token value does not change due to a change in the certificate store for the current configuration until all the in progress Diagnose '0320' instruction instances complete execution. A certificate store token value is not reused, in one example, until each possible certificate store token value has been used, to prevent the software (e.g., program) from seeing the same certificate store token value for two different certificate store versions. This process ensures that the program does not see updated results while it is gathering the verification certificates list and/or the verification certificate extracts list for the current configuration asynchronously in, e.g., a scatter-gather list by issuing multiple instances of Diagnose '0320' instruction.

In one or more aspects, the Diagnose '0320' instruction returns various storage sizes specific to the verification certificate blocks and the verification certificate extract blocks including the following, as an example:

A count (e.g., total verification certificate count 608) of verification certificates available in the certificate store for the current configuration. The verification certificates and the verification certificate extracts are organized using, e.g., indexes and the software program is to have the count of verification certificates and/or verification certificate extracts.

A largest singleton verification certificate block length (e.g., length 616)/largest singleton verification certificate extract block length (e.g., length 620) to be used to determine the minimum number of bytes the program is to have to obtain a verification certificate block/verification certificate extract block with at least one verification certificate block entry/verification certificate extract block entry that is currently available in the certificate store for the current configuration.

A total verification certificate block length (e.g., length 618) for the current configuration to be used to determine the minimum number of bytes the program is to have to obtain a verification certificate block with, e.g., all verification certificate block entries that are currently available in the certificate store for the current configuration.

A total verification certificate extract block length (e.g., length 622) for the current configuration to be used to determine the minimum number of bytes the program is to have to obtain a verification certificate block with, e.g., all verification certificate extract block entries that are currently available in the certificate store for the current configuration.

A number of bytes that can be used by the maximum number of verification certificate entries that are supported by the current machine model (e.g., maximum verification certificates count 610, maximum verification certificate entry length 612).

A number of bytes (e.g., maximum verification certificates count 610, maximum verification certificate extract entry length 614) that can be used by the maximum number of verification certificate extract entries that are supported by the current machine model.

Additional, fewer and/or other sizes/storage size information may be returned in other examples.

In one or more aspects, the program does not have to continuously check for changes in the verification certificates list and/or verification certificate extracts list for the current configuration, which speeds up and simplifies the checking process and eliminates some coding efforts and testing by each operating system. The hypervisor does not have to waste time formulating and returning the data that would be thrown away by the program, which reduces the execution time. The operating system has the freedom to choose one of multiple storage management schemes that works best for each operating system to manage its memory. Using the dynamically updatable certificate store (instead of firmware embedded certificates) allows the customer to easily update the certificate store with new verification certificates when new certificates are available and to be used to verify the signed code component(s).

In addition to subcode 1, Diagnose instruction 400 may also specify other subcodes, including, in accordance with an aspect of the present invention, subcode 2. Further details relating to subcode 2 are described below.

Subcode 2—Store Verification Certificates

In one or more aspects, a program (e.g., a boot loader, an operating system, other programs, etc.) may use Diagnose '0320' subcode 2 to obtain the verification certificates (which contain the verification keys) directly. Subcode 2 is used to find one or more verification certificates and certain verification certificate related information that are currently in the certificate store for the current configuration. In one example, a verification key within the verification certificate is used to perform the signature verification.

In one example, the Diagnose '0320' subcode 2 function is valid when the certificate store facility is installed in one particular architecture and architectural mode (e.g., z/Architecture instruction set architecture in architectural mode). This check may not be performed for other architectures and/or other architectures may perform other checks. Many possibilities exist.

In one example, a logical address of a verification certificate block (VCB) is generated under the control of the current addressing mode. The logical address is to be designated on, e.g., a 4K-byte boundary; otherwise, a specification exception is recognized, in one example. A verification certificate block, an example of which is described below, may be, e.g., multiple 4K-bytes in length. The length of the verification certificate block is specified in, e.g., multiple 4K-bytes by a verification certificate block input length field at, e.g., word 0 of the verification certificate block.

The verification certificate block includes, for instance, the output data returned by Diagnose '0320' subcode 2 when the operation completes successfully. It includes, for instance, a common header followed by, e.g., zero or more verification certificate entries (VCEs).

In one example, a specified first verification certificate index (FVCI) and a specified last verification certificate index (LVCI) provides a range of verification certificates that are to be stored by the store verification certificate function. In one example, a count of verification certificate entries that are stored in the verification certificate block is stored in a stored verification certificate count (SVCC) field of the verification certificate block. Storing of a partial verification certificate entry is not supported, in one example.

In one example, if verification certificates do not exist for the specified verification certificate index range or for the configuration in general, a verification certificate block output length is set to, e.g., a defined value, e.g., 64. The stored verification certificate count is set to, e.g., zero, the remaining verification certificate count is set to, e.g., zero, and a response code 422 of, e.g., 0001 hex is returned in, e.g., bit positions 48-63 of general register $R_1+1$.

In one example, when sufficient storage is not provided in the verification certificate block input length field to store at least the first requested verification certificate entry, none of the requested verification certificate entry is stored and a verification certificate block output length (in the verification certificate block) is set to, e.g., a defined value, e.g., 64. The stored verification certificate count is set to, e.g., zero, the remaining verification certificate count is set to, e.g., the count of verification certificate entries that could not be stored in the verification certificate block, and a response code 422 of, e.g., 0001 hex is returned in, e.g., bit positions 48-63 of general register R₁+1.

In one example, when sufficient storage is not provided in the verification certificate block input length field to store the requested verification certificate entries, a maximum number of verification certificate entries that fit in the verification certificate block is stored in a stored verification certificate count (SVCC) of the verification certificate block and the count of verification certificate entries that could not be stored in the verification certificate block is stored in a remaining verification certificate count (RVCC) field of the verification certificate block.

In operation, in one example, subcode 2 (i.e., e.g., execution of Diagnose instruction 400 with subcode 432 set to 2) is used by, e.g., a program to obtain the verification certificates (which contain the verification keys) directly. Subcode 2 is used to find one or more verification certificates and certain verification certificate related information currently in the certificate store for the current configuration. In one example, the program is to specify the first and last verification certificate it wants, as well as the certificate store token, and subcode 2 provides the verification certificate block output length which corresponds to the amount of the program's memory that, e.g., the firmware can use to return the certificate(s), if any, from the specified range.

In one example, the Diagnose '0320' instruction, subcode 1 (Query Verification Certificate Storage Information) previously returned the number of verification certificates in the machine's common verification certificate store and there are, in on example, no gaps from the index of the first verification certificate thru the last verification certificate. Therefore, the specification of the first and last verification certificate allows the requesting program to obtain the verification certificate(s) that it wants, provided the certificate(s) fit within the memory provided to, e.g., the firmware. If desired, the program can issue the Diagnose '0320' subcode 2 instruction repeatedly to eventually have the firmware return to it, e.g., all verification certificates in the common certificate store in the machine for the current configuration.

The certificate store token supplied (e.g., as an output of subcode 1 and used as an input to subcode 2) is to match the current certificate token. In one example, an error is returned if the supplied certificate store token does not match the current value. This then provides a simple technique for ensuring the verification certificates in the common certificate store in the machine have not changed since the Diagnose '0320' instruction subcode 1 was issued, including any previous Diagnose '0320' instruction subcode 2 operations that were also issued.

In one example, if there are no verification certificates in the specified range, then the results of the Diagnose '0320' subcode 2 returned by the machine's firmware will indicate this. If there are verification certificates in the specified range, then the returned information includes, for instance, the number of returned verification certificate entries, starting, e.g., with the verification certificate at the first verification certificate index. The number will be the smaller of either the actual number of verification certificates in the specified range or the number that will fit in the provided memory.

Each verification certificate entry includes, for instance, the actual verification certificate (VC), as well as, for instance, a verification certificate index, a verification certificate name supplied by the user when it was imported into the machine's common certificate store, and/or other information related to the verification certificate, as described herein.

In one or more aspects, the program (e.g., boot loader, operating system, etc.) issues the Diagnose '0320' instruction specifying subcode 2, a verification certificate entries range and a certificate store token to obtain one or more verification certificates that are in the certificate store for the current configuration. The hypervisor returns an error, in one example, if the current certificate store token of the certificate store for the current configuration is different than the specified certificate store token value. This mechanism allows the hypervisor to ensure that the verification certificates list for this configuration did not change while retrieving them using this and subsequent Diagnose '0320' functions asynchronously for the same certificate store version, as represented by the certificate store token value, for the current configuration. This technique eliminates having the program check the current certificate store token value against the returned/saved certificate store token value (obtained from Diagnose '0320' subcode 1) to determine if one or more verification certificates have changed.

In one aspect, the Diagnose '0320' instruction returns one or more verification certificates, based on the verification certificate entries range, that are in the certificate store for the current configuration. The one or more verification certificates are returned in the verification certificate block, which includes, for instance, a header followed by one or more verification certificate entries. The header includes, for example, a specified first verification certificate index and a specified last verification certificate index to be used to determine the range of verification certificates that are to be stored by the store verification certificate function; and a count of verification certificate entries (VCEs) that are stored in the verification certificate block. When enough storage is not provided in the verification certificate block input length field to store the requested verification certificate entries, the count of verification certificate entries that could not be stored in the verification certificate block is stored in the remaining verification certificate count (RVCC) field, in one example.

Each verification certificate block entry includes, for instance, information for one verification certificate.

Figure 7A:
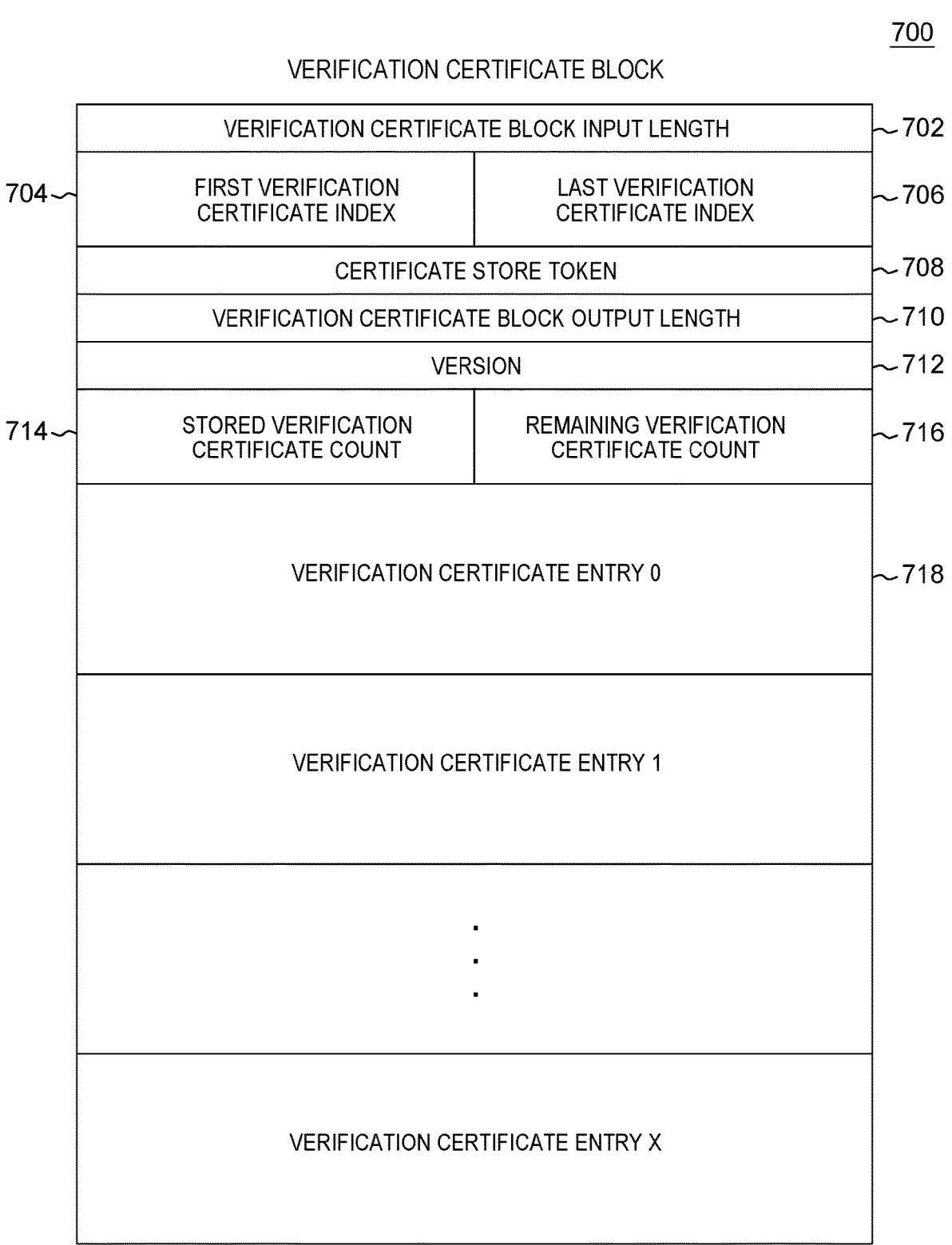
FIG. 7A depicts one example of a verification certificate block used in accordance with one or more aspects of the present invention.

Further details relating to a verification certificate block and verification certificate entries are described with reference to FIGS. 7A-7B. In one example, a verification certificate block 700 (FIG. 7A) includes a common header (e.g., 16-words) followed by zero or more verification certificate entries (VCE). In one example, selected locations of the common header (e.g., words 0-7) include input data and other selected locations of the common header (e.g., words 8-15) include output data. In one example, subcode 2 stores a verification certificate list in the certificate format into the verification certificate block.

In one example, verification certificate block 700 includes the following fields:

Verification Certificate Block (VCB) Input Length 702: This field (e.g., word 0) includes an unsigned binary integer (e.g., 32-bit) specifying the number of bytes in the verification certificate block. In one example, the value is to be a nonzero multiple of, e.g., 4K; otherwise, a response code 422 of, e.g., 0204 hex is returned in, e.g., bit positions 48-63 of general register R₁+1.

First Verification Certificate Index 704: This field (e.g., bytes 0-1 of word 2) includes an unsigned binary integer (e.g., 16-bit) specifying the index of the verification certificate in the certificate store that is to be stored in the first verification certificate entry. In one example, the value is to be less than or equal to the value of a last verification certificate index; otherwise, a response code 422 of, e.g., 0302 hex is returned in, e.g., bit positions 48-63 of general register $R_1+1$.

Last Verification Certificate Index 706: This field (e.g., bytes 2-3 of word 2) includes an unsigned binary integer (e.g., 16-bit) specifying the index of the verification certificate in the certificate store that is to be stored in the last verification certificate entry.

In one example, a value of zero is a valid index for the first and/or the last verification certificate index for this instruction. However, as the certificate store maintains a one origin for the index, no certificate for index value zero is available. A request for a single certificate of index zero results in zero certificates returned. A request for multiple certificates starting at zero results in the first returned certificate entry containing the certificate index of one.

Certificate Store (CS) Token 708: This field (e.g., word 4) includes an unsigned binary integer (e.g., 32-bit) specifying the version of the verification certificates that are to be stored in the verification certificate entries. If the specified certificate store token value does not match the current certificate store token value in the certificate store for the configuration, a response code 422 of, e.g., 0306 hex is returned in, e.g., bit positions 48-63 of general register $R_1+1$.

Verification Certificate Block Output Length 710: This field (e.g., word 8) includes an unsigned binary integer (e.g., 32-bit) specifying the total number of bytes in the verification certificate block when the operation completes successfully. In one example, the value is greater than or equal to, e.g., 64.

Version 712: This field (e.g., byte 3 of word 9) includes an unsigned binary integer (e.g., 8-bit) specifying the version number for the verification certificate block. This field is set to, e.g., zero.

Stored Verification Certificate Count 714: This field (e.g., bytes 0-1 of word 10) includes an unsigned integer (e.g., 16-bit) count of verification certificates stored in the verification certificate block.

Remaining Verification Certificate Count 716: This field (e.g., bytes 2-3 of word 10) includes an unsigned integer (e.g., 16-bit) count of verification certificates that could not be stored in the verification certificate block due to insufficient storage specified in the verification certificate block input length field.

Verification Certificate Entry 718: In one example, the verification certificate block (e.g., words 16 through N) may contain zero or more verification certificate entries based on the verification certificate block input length and the verification certificate range (e.g., from first verification certificate index to last verification certificate index) that are currently in the certificate store for the configuration. In one example, a verification certificate entry has a common header followed by a verification certificate in the certificate format.

In one example, each verification certificate entry is aligned, e.g., word aligned. Each variable length field within the verification certificate entry is also aligned, e.g., word aligned. In one example, gaps are formed among the verification certificate entries using the verification certificate entry length that is a multiple of, e.g., four and among the verification certificate entry fields using the verification certificate entry field offset that is a multiple of, e.g., four to provide, e.g., word boundary alignment. The verification certificate entry field length includes a value that is, e.g., the actual size of the verification certificate entry field and the unused area (gap) following the verification certificate entry field contains, e.g., zeros.

In one example, each variable length field within the verification certificate entry has an offset and a length. The offset of a variable length field is used to locate that variable length field, and the length of a variable length field is used to determine the number of bytes contained in that variable length field.

Figure 7B:
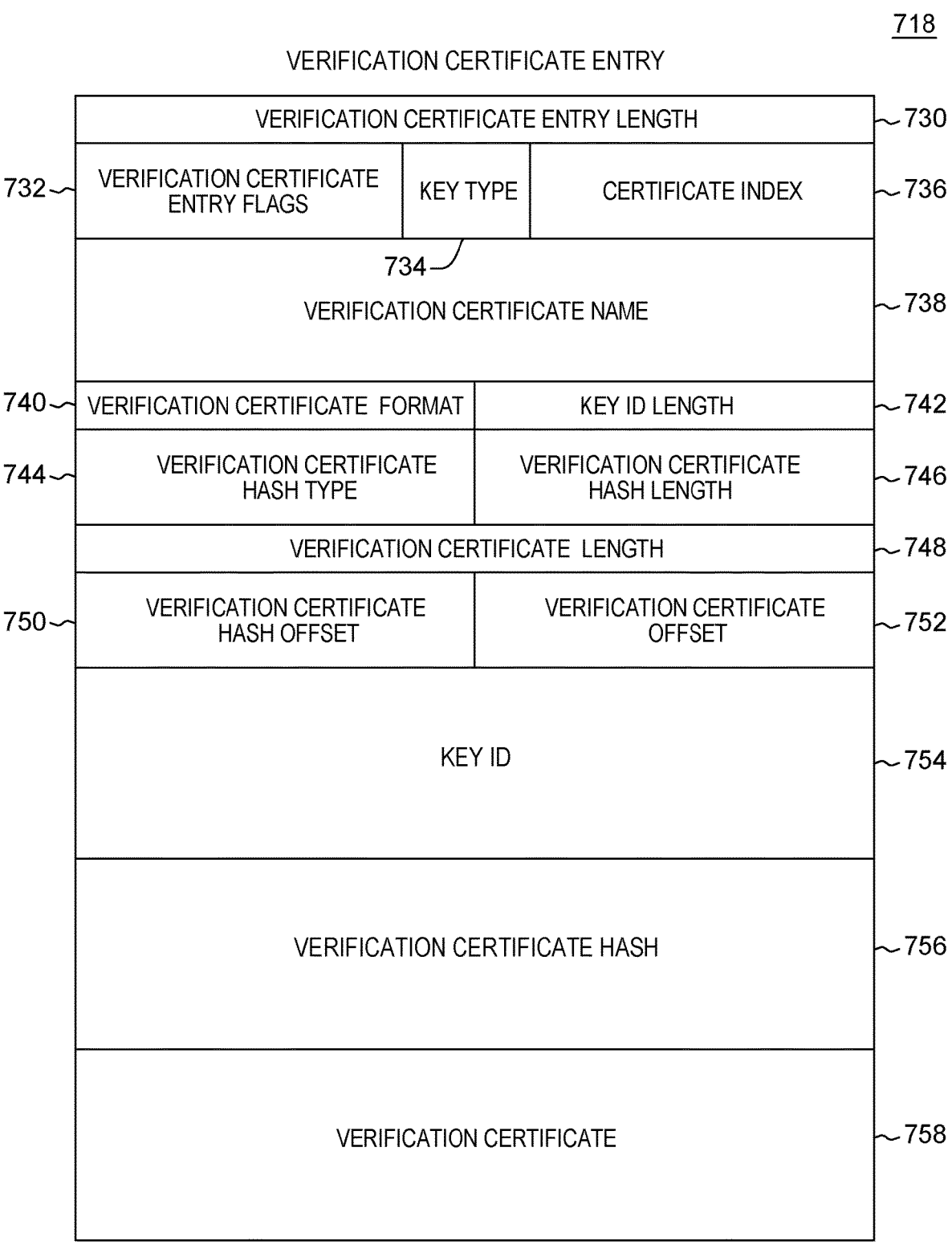
FIG. 7B depicts one example of a verification certificate entry of the verification certificate block of FIG. 7A, in accordance with one or more aspects of the present invention.

In one example, as shown in FIG. 7B, a verification certificate entry 718 includes the following fields:

Verification Certificate Entry Length 730: This field (e.g., word 0) includes an unsigned binary integer (e.g., 32-bit) specifying a number of bytes in the entire verification certificate entry. The verification certificate entry length field value is a multiple of, e.g., 4-bytes.

Verification Certificate Entry Flags 732: This field (e.g., byte 0 of word 1) includes a flag field defined as follows, in one example:

| Bit | Meaning |
|-----|---------|
| 0 | Verification Certificate Valid (VCV): <br> When bit 0 is, e.g., one, <br> the verification certificate is valid for this configuration and <br> the verification certificate entry includes the verification <br> certificate. <br> When the bit is, e.g., zero, <br> the verification certificate is invalid for this configuration <br> and <br> the verification certificate entry length is set to, e.g., 72. |
| 1-7 | Reserved |

Key Type 734: This field (e.g., byte 1 of word 1) includes an unsigned binary integer (e.g., 8-bit) specifying the key type of the public key used to verify the signature of one or more signed binary code components.

The key type field values are defined as follows, in one example:

| Value | Meaning |
|-------|---------|
| 0 | Unsupported key type |
| 1 | ECDSA (Elliptic Curve Digital Signature Algorithm) - NIST <br> (National Institute of Standards and Technology) Curve P521 |
| 2-255 | Reserved |

Certificate Index 736: This field (e.g., bytes 2-3 of word 1) includes an unsigned binary integer (e.g., 16-bit) specifying the index of the current verification certificate in the certificate store for the configuration. It also represents the index of the directly associated verification certificate extract.

Verification Certificate Name 738: This field (e.g., words 2-17) includes a name (e.g., 64-byte) of the verification certificate as it appears on the service element (SE) (e.g., a service element may be part of and/or coupled to one or more logical partitions and used to facilitate initial program loading). The verification certificate name is in, e.g., EBCDIC (Extended Binary Coded Decimal Interchange Code) character format, left justified with padding on the right in, e.g., EBCDIC character format. In one example, the verification certificate name is used to identify a verification certificate in the certificate store via a service element panel since the verification certificate index is, e.g., an internal mechanism and not displayed in the service element panel. Other possibilities exist.

Verification Certificate Format 740: This field (e.g., byte 0 of word 18) includes an unsigned binary integer (e.g., 8-bit) specifying a format of the verification certificate. The verification certificate format field values are defined as follows, in one example:

| Value | Meaning |
|---|---|
| 0 | Unsupported Verification Certificate format |
| 1 | x.509 certificate in DER (Distinguished Encoding Rules) format. |
| 2-255 | Reserved |

Key ID Length 742: This field (e.g., bytes 2-3 of word 18) includes an unsigned binary integer (e.g., 16-bit) specifying a number of, e.g., bytes in the key ID field. The key ID length field value is a multiple of, e.g., 1-byte.

Verification Certificate Hash Type 744: This field (e.g., byte 1 of word 19) includes an unsigned binary integer (e.g., 8-bit) specifying the hash type of the verification hash (a.k.a., fingerprint) used to identify a verification certificate. The verification certificate hash type field values are defined as follows, in one example:

| Value | Meaning |
|---|---|
| 0 | Unsupported Verification Certificate hash type |
| 1 | SHA2-256 (Secure Hash Algorithm) |
| 2-255 | Reserved |

Verification Certificate Hash Length 746: This field (e.g., bytes 2-3 of word 19) includes an unsigned binary integer (e.g., 16-bit) specifying a number of bytes in the verification certificate hash field. The verification certificate hash length field value is a multiple of, e.g., 1-byte.

Verification Certificate Length 748: This field (e.g., word 21) includes an unsigned binary integer (e.g., 32-bit) specifying a number of bytes in the verification certificate field. The verification certificate length field value is a multiple of, e.g., 1-byte.

Verification Certificate Hash Offset 750: This field (e.g., bytes 0-1 of word 24) includes an unsigned binary integer (e.g., 16-bit) specifying an offset of the verification certificate hash field. The verification certificate hash offset field value is a multiple of, e.g., 4-bytes.

Verification Certificate Offset 752: This field (e.g., bytes 2-3 of word 24) includes an unsigned binary integer (e.g., 16-bit) specifying an offset of the verification certificate field. The verification certificate offset field value is a multiple of, e.g., 4-bytes.

Key ID 754: This field (e.g., words 32-A) includes the key ID used to identify the public key in the verification certificate. The key ID length field specifies, e.g., the number of bytes that are in the key ID field. The key ID field is, e.g., word aligned.

Verification Certificate Hash 756: This field (e.g., words A+1-B) includes the hash value of the verification certificate (a.k.a., fingerprint), which can be used to identify a verification certificate in, e.g., the firmware embedded code implementation. The verification certificate hash length field specifies, e.g., the number of bytes that are in the verification certificate hash field. The verification certificate hash field is, e.g., word aligned. This data is in, e.g., big-endian binary format.

Verification Certificate 758: This field (e.g., words B+1-N) includes the verification certificate. The verification certificate length field specifies, e.g., a number of bytes that are in the verification certificate field. The verification certificate field is, e.g., word aligned.

In one or more aspects, the hypervisor and the program work cooperatively to ensure that the program gets the entire verification certificates list for the current configuration asynchronously in, e.g., a scatter-gather list for the same certificate store version (same certificate store token value) even if the certificate store token value changes while gathering a partial verification certificates list by issuing multiple instances of the Diagnose '0320' instruction. The hypervisor detects a certificate store token mismatch based on a program specified certificate store token value and terminates the instruction instead of wasting machine processing time constructing a response that the program would discard and restart the verification certificate collection process.

The Diagnose '0320' instruction locates, based on the verification certificate entries range, each verification certificate from the certificate store for the current configuration and returns it in a verification certificate entry in the verification certificate format. The return of verification certificates is further described with reference to FIGS. 5A and 5C.

In one example, referring to FIG. 5A, based on determining 514 that a Diagnose '0320' subcode 2 function is to be performed, process 500 performs 516 the function. Further details relating to performing the function to store verification certificates (subcode 2) are described with reference to FIG. 5C.

In one embodiment, a process 516b determines 540 a range of verification certificates to be stored in, e.g., a verification certificate block. For instance, a specified first verification certificate index (e.g., index 704 obtained from verification certificate block 700 input to the instruction) and a specified last verification certificate index (e.g., index 706 obtained from verification certificate block 700) provide a range of verification certificates that are to be stored by the store verification certificate function.

Process 516b determines 542 if verification certificates exist in the certificate store for the specified range or for the requesting configuration in general. If there are one or more verification certificates in the certificate store in the specified range for the requesting configuration, process 516b further determines 543 whether the certificate store token supplied as, e.g., an input to subcode 2 matches the current certificate store token of the requesting configuration. In one example, if the supplied certificate store token value matches the current certificate store token value, process 516b further determines 544 whether there is sufficient storage in the verification certificate block for at least one verification certificate entry (e.g., verification certificate) in the verification certificate block. If there is sufficient storage in the verification certificate block for at least one verification certificate entry, process 516b stores 546 one or more verification certificates from the certificate store in the verification certificate block. Further, process 516b stores 548 a count (e.g., count 714) of the number of verification certificates stored in the verification certificate block.

Process 516b determines 552 whether there was sufficient storage to store the requested verification certificate entries in the verification certificate block. Should there be insufficient storage to store the requested verification certificate entries in the verification certificate block, in one example, process 516b sets 556 in the verification certification block a stored verification certificate count (e.g., count 714) to the number of entries stored in the verification certificate block and sets 558 in the verification certificate block a remaining verification certificates count (e.g., count 716) to the number of requested entries that could not be stored.

Process 516*b* returns 560 a response code (e.g., response code 422) of, 0001 hex, e.g., in one example.

Returning to inquiry 552, if there is sufficient storage to store the requested verification certificates, process 516*b* returns 560 a response code (e.g., response code 422) of, 0001 hex, e.g., in one example.

Returning to inquiry 542, if no verification certificates exist for the specified range or for the configuration, process 516*b* sets 562 a verification certificate block output length (e.g., length 710) to a defined length (e.g., 64); sets 556 the stored verification certificate count (e.g., count 714) to, e.g., zero; and sets 558 the remaining verification certificate count (e.g., count 716) to, e.g., zero. Process 516*b* returns 560 a response code (e.g., response code 422) of, e.g., 0001 hex.

Further, returning to inquiry 543, if the supplied certificate store token value does not match the current certificate store token value, process 516*b* returns a response code (e.g., response code 422) of, e.g., 0306 hex, indicating an error.

Moreover, returning to inquiry 544, if sufficient storage is not indicated in, e.g., verification certificate block input length 702 to store at least the first requested verification certificate, none of the requested verification certificate entries are stored, and process 516*b* sets 562 verification certificate block output length 710 to a defined value (e.g., 64); sets 556 stored verification certificate count 714 to, e.g., zero; and sets 558 remaining verification certificate count 716 to, e.g., a count of the verification certificate entries that could not be stored. Process 516*b* returns 560 a response code (e.g., response code 422) of, e.g., 0001 hex.

In one or more aspects, the program does not have to continuously check for changes in the verification certificates list for the current configuration which speeds up the checking process and eliminates some coding efforts and testing by each software. The hypervisor does not waste processing time constructing a response that the program would discard anyway. The program has the freedom to obtain verification certificate entries using an entry range to match its storage management scheme that works best for each software. Using the dynamically updatable certificate store (instead of firmware embedded certificates) allows the customer to easily update the certificate store with new verification certificates when new certificates are available to verify the signed code component. A mechanism is provided to associate and display a verification certificate in the certificate store via, e.g., a service element panel with a software obtained verification certificate using, for example, the verification certificate name and verification certificate index. The program is able to internally associate a verification certificate using, for instance, the verification certificate name key ID, fingerprint, and/or verification certificate index, as examples.

In addition to subcodes 1 and 2, Diagnose instruction 400 may also specify other subcodes, including, in accordance with an aspect of the present invention, subcode 3. Further details relating to subcode 3 are described below.

Subcode 3—Store Verification Certificate Extracts

In one or more aspects, a program (e.g., a boot loader, an operating system, other programs, etc.) may use Diagnose '0320' subcode 3 to obtain the extracted verification key materials (in an easy-to-consume format) that are currently in the certificate store for the current configuration. This is particularly useful, for instance, if the program cannot directly parse the certificates to obtain the verification key materials.

In one example, subcode 3 provides verification certificate extracts (VCXs) that are in the certificate store for the configuration. The verification key within the verification certificate extract is used to perform the signature verification.

In one example, Diagnose '0320' subcode 3 is valid when the certificate store facility is installed in one particular architecture and architectural mode (e.g., z/Architecture instruction set architecture in architectural mode). This check may not be performed for other architectures and/or other architectures may perform other checks. Many possibilities exist.

In one example, a logical address of a verification certificate extract block (VCXB) is generated under the control of the current addressing mode. The logical address is to be designated on, e.g., a 4K-byte boundary; otherwise, a specification exception is recognized, in one example. The verification certificate extract block may be, e.g., a multiple of, e.g., 4K-bytes in length. The length of the verification certificate extract block is specified in, e.g., a multiple of 4K-bytes by a verification certificate extract block input length field at, e.g., word 0 of the verification certificate extract block.

The verification certificate extract block includes, for instance, the output data returned by Diagnose '0320' subcode 3 when the operation completes successfully. It includes, for instance, a common header followed by, e.g., zero or more verification certificate extract entries (VCXEs).

In one example, a specified first verification certificate extract index (FVCXI) and a specified last verification certificate extract index (LVCXI) provides a range of verification certificate extracts that are to be stored by the store verification certificate extracts function. In one example, a count of verification certificate extract entries that are stored in the verification certificate extract block is stored in a stored verification certificate extract count (SVCXC) field of the verification certificate extract block. Storing of a partial verification certificate extract entry is not supported, in one example.

In one example, if verification certificate extracts do not exist for the specified verification certificate extract index range or for the configuration in general, a verification certificate extract block output length is set to, e.g., a defined value, e.g., 64. The stored verification certificate extract count is set to, e.g., zero, the remaining verification certificate extract count (RVCXC) is set to, e.g., zero, and a response code 422 of, e.g., 0001 hex is returned in, e.g., bit positions 48-63 of general register $R_1+1$.

In one example, when sufficient storage is not provided in the verification certificate extract block input length field to store at least the first requested verification certificate extract entry, none of the requested verification certificate extract entries is stored and the verification certificate extract block output length is set to, e.g., a defined value, e.g., 64. The stored verification certificate extract count is set to, e.g., zero, the remaining verification certificate extract count is set to, e.g., the count of verification certificate extract entries that could not be stored in the verification certificate extract block, and a response code 422 of, e.g., 0001 hex is returned in, e.g., bit positions 48-63 of general register $R_1+1$.

In one example, when sufficient storage is not provided in the verification certificate extract block input length field to store the requested verification certificate extract entries, a maximum number of verification certificate extract entries that fits in the verification certificate extract block is stored in the stored verification certificate extract count of the verification certificate extract block and the count of verification certificate extract entries that could not be stored in the verification certificate extract block is stored in the remaining verification certificate extract count field of the verification certificate extract block.

In operation, in one example, subcode 3 (i.e., e.g., execution of Diagnose instruction 400 with subcode 432 set to 3) is used by, e.g., a program to obtain extracted verification key material (e.g., in an easy to consume format) that is currently in the certificate store for the current configuration. In one example, the program is to specify the first and last verification certificate extract it wants, as well as the certificate store token, and subcode 3 provides the verification certificate extract block output length which corresponds to the amount of the program's memory that, e.g., the firmware can use to return the certificate extract(s), if any, from the specified range.

In one example, the Diagnose '0320' instruction, subcode 1 (Query Verification Certificate Storage Information) previously returned the number of verification certificates, which is equal, in one example, to the number of verification certificate extracts in the machine's common verification certificate store. Therefore, the specification of the first and last verification certificate extract allows the requesting program to obtain the verification extract(s) that it wants, provided the certificate extract(s) fit within the memory provided to, e.g., the firmware. If desired, the program can issue the Diagnose '0320' subcode 3 instruction repeatedly to eventually have the firmware return to it, e.g., all verification certificate extracts in the common certificate store in the machine for the current configuration.

The certificate store token supplied (e.g., as an output of subcode 1 and used as an input to subcode 3) is to match the current certificate token. In one example, an error is returned if the supplied certificate store token does not match the current value. This then provides a simple technique for ensuring the verification certificates (and hence verification certificate extracts) in the common certificate store in the machine have not changed since the Diagnose '0320' instruction subcode 1 was issued, including any previous Diagnose '0320' instruction subcode 3 operations that were also issued.

In one example, if there are no verification certificate extracts in the specified range, then the results of the Diagnose '0320' subcode 3 returned by the machine's firmware will indicate this. If there are verification certificate extracts in the specified range, then the returned information includes, for instance, the number of returned verification certificate extract entries, starting, e.g., with the verification certificate extract at the first verification certificate extract index. The number will be the smaller of either the actual number of verification certificate extracts in the specified range or the number that will fit in the provided memory.

The verification key materials are extracted, in one example, only for specific verification key types. There may not be a verification certificate extract for every verification certificate. For such an implementation, the verification certificate extract entries are not compacted to remove verification certificate extract entries that do not have a valid verification certificate extract. Instead, a verification certificate extract entry that does not have a valid verification certificate extract is considered to be an invalid verification certificate extract entry and is indicated in the verification certificate extract entry containing just the header, and, for instance, a verification certificate extract valid (VCXV) flag set to, e.g., zero. For example, a verification certificate extract entry contains the actual verification certificate extract information when the corresponding verificertificate contains one of the key types for which verification key material is extracted. This information includes, for instance, the time the verification certificate is first valid, the last time the verification certificate is valid, information about the verification certificate, information about the type of the verification key, as well as an extracted verification key block (XVKB) containing the actual variable size verification key(s).

In one or more aspects, the program (e.g., boot loader, operating system, etc.) issues the Diagnose '0320' instruction specifying subcode 3, a verification certificate extract entries range and a certificate store token to obtain one or more verification certificate extracts that are in the certificate store for the current configuration. The hypervisor returns an error, in one example, if the current certificate store token of the certificate store for the current configuration is different than the specified certificate store token value. This mechanism allows the hypervisor to ensure that the verification certificate extracts list for this configuration did not change while retrieving them using this and subsequent Diagnose '0320' functions asynchronously for the same certificate store version, as represented by the certificate store token value, for the current configuration. This technique eliminates having the program check the current certificate store token value against the returned/saved certificate store token value (obtained from Diagnose '0320' subcode 1) to determine if one or more verification certificates have changed.

In one aspect, the Diagnose '0320' instruction returns one or more verification certificate extracts, based on the verification certificate extract entries range, that are in the certificate store for the current configuration. The one or more verification certificate extracts are returned in the verification certificate extract block, which includes, for instance, a header followed by one or more verification certificate extract entries. The header includes, for example, a specified first verification certificate extract index and a specified last verification certificate index to be used to determine the range of verification certificate extracts that are to be stored by the store verification certificate extracts function; and a count of verification certificate extract entries (VCXEs) that are stored in the verification certificate extract block. When enough storage is not provided in the verification certificate extract block input length field to store the requested verification certificate extract entries, the count of verification certificate extract entries that could not be stored in the verification certificate extract block is stored in the remaining verification certificate extract count field, in one example.

Each verification certificate extract block entry includes, for instance, information for one verification certificate extract.

Figure 8A:
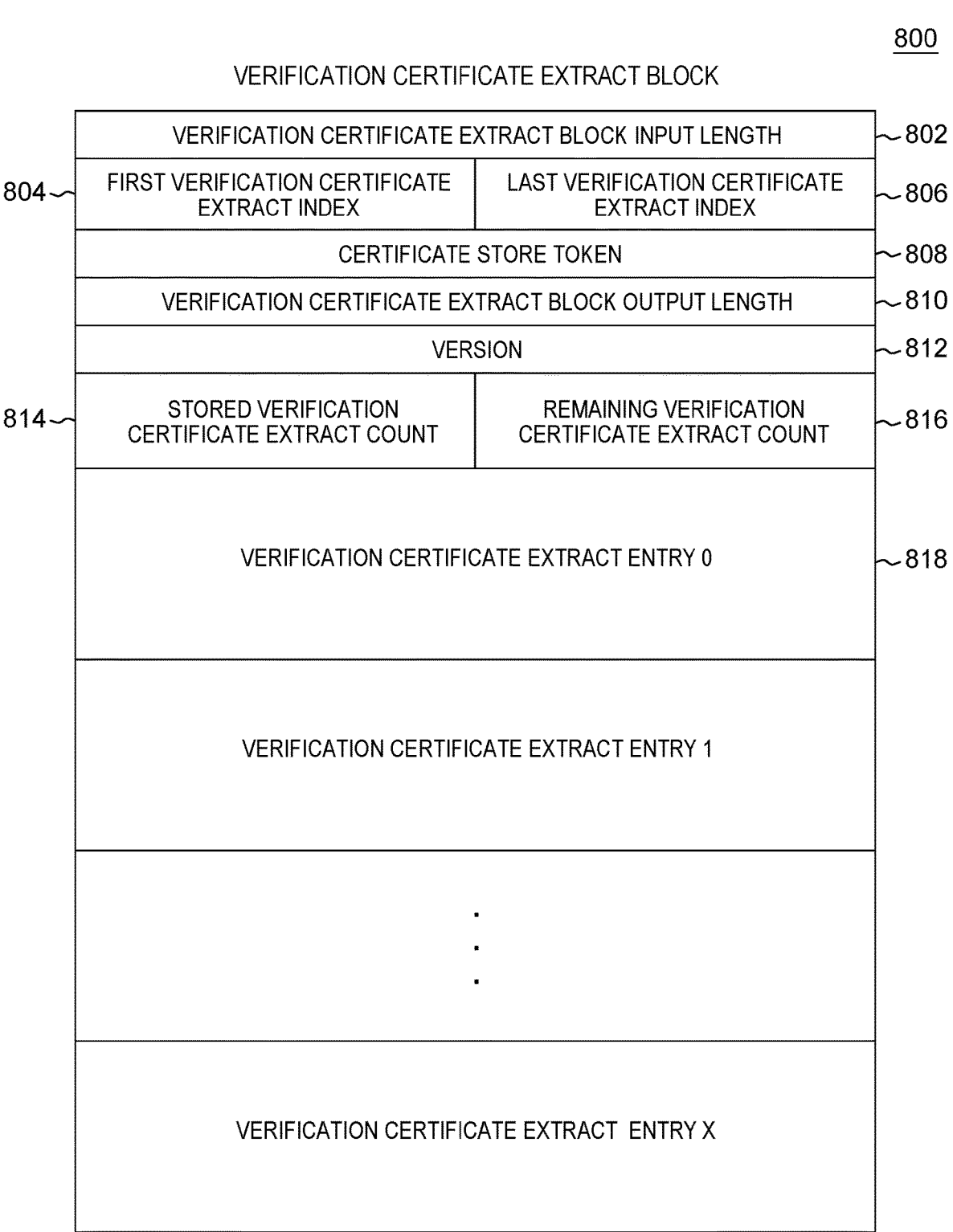
FIG. 8A depicts one example of a verification certificate extract block used in accordance with one or more aspects of the present invention.

Further details relating to a verification certificate extract block and verification certificate extract entries are described with reference to FIGS. 8A-8B. In one example, a verification certificate extract block 800 (FIG. 8A) includes a common header (e.g., 16-words) followed by zero or more verification certificate extract entries (VCXE). In one example, selected locations of the common header (e.g., words 0-7) include input data and other selected locations of the common header (e.g., words 8-15) include output data. In one example, subcode 3 stores a verification certificate extract list in the extracted key type format into the verification certificate extract block.

In one example, verification certificate extract block 800 includes the following fields:

Verification Certificate Extract Block (VCXB) Input Length 802: This field (e.g., word 0) includes an unsigned binary integer (e.g., 32-bit) specifying the number of bytes in the verification certificate extract block. In one example, the value is to be a nonzero multiple of, e.g., 4K; otherwise, a response code 422 of, e.g., 0206 hex is returned in, e.g., bit positions 48-63 of general register $R_1$+1.

First Verification Certificate Extract Index 804: This field (e.g., bytes 0-1 of word 2) includes an unsigned binary integer (e.g., 16-bit) specifying the index of the verification certificate extract in the certificate store that is to be stored in the first verification certificate extract entry. In one example, the value is to be less than or equal to the value of a last verification certificate extract index; otherwise, a response code 422 of, e.g., 0304 hex is returned in, e.g., bit positions 48-63 of general register $R_1$+1.

Last Verification Certificate Extract Index 806: This field (e.g., bytes 2-3 of word 2) includes an unsigned binary integer (e.g., 16-bit) specifying the index of the verification certificate extract in the certificate store that is to be stored in the last verification certificate extract entry.

In one example, a value of zero is a valid index for the first and/or the last verification certificate extract index for this instruction. However, as the certificate store maintains a one origin for the index, no certificate extract for index value zero is available. A request for a single certificate extract of index zero results in zero certificate extracts returned. A request for multiple certificate extracts starting at zero results in the first returned certificate extract entry containing the certificate index of one.

Certificate Store (CS) Token 808: This field (e.g., word 4) includes an unsigned binary integer (e.g., 32-bit) specifying the version of the verification certificate extracts that are to be stored in the verification certificate extract entries. If the specified certificate store token value does not match the current certificate store token value in the certificate store for the configuration, a response code 422 of, e.g., 0306 hex is returned in, e.g., bit positions 48-63 of general register $R_1$+1.

Verification Certificate Extract Block Output Length 810: This field (e.g., word 8) includes an unsigned binary integer (e.g., 32-bit) specifying the number of bytes returned in the verification certificate extract block when the operation completes successfully. In one example, the value is greater than or equal to, e.g., 64.

Version 812: This field (e.g., byte 3 of word 9) includes an unsigned binary integer (e.g., 8-bit) specifying the version number for the verification certificate extract block. This field is set to, e.g., zero.

Stored Verification Certificate Extract Count 814: This field (e.g., bytes 0-1 of word 10) includes an unsigned integer (e.g., 16-bit) count of verification certificate extracts stored in the verification certificate extract block.

Remaining Verification Certificate Extract Count 816: This field (e.g., bytes 2-3 of word 10) includes an unsigned integer (e.g., 16-bit) count of verification certificate extracts that could not be stored in the verification certificate extract block due to insufficient storage specified in the verification certificate extract block input length field.

Verification Certificate Extract Entry 818: In one example, the verification certificate extract block (e.g., words 16 through N) may contain zero or more verification certificate extract entries based on the verification certificate extract block input length and the verification certificate extract range (e.g., from first verification certificate extract index to last verification certificate extract index) that are currently in the certificate store for the configuration. In one example, a verification certificate extract entry has a common header followed by a verification certificate extract in the extracted key type format.

In one example, each verification certificate extract entry is aligned, e.g., word aligned. Each variable length field within the verification certificate extract entry is also aligned, e.g., word aligned. In one example, gaps are formed among the verification certificate extract entries using the verification certificate extract entry length that is a multiple of, e.g., four and among the verification certificate extract entry fields using the verification certificate extract entry field offset that is a multiple of, e.g., four to provide, e.g., word boundary alignment. The verification certificate extract entry field length includes a value that is, e.g., the actual size of the verification certificate extract entry field and the unused area (gap) following the verification certificate extract entry field contains, e.g., zeros.

In one example, each variable length field within the verification certificate extract entry has an offset and a length. The offset of a variable length field is used to locate that variable length field, and the length of a variable length field is used to determine the number of bytes contained in that variable length field.

Figure 8B:
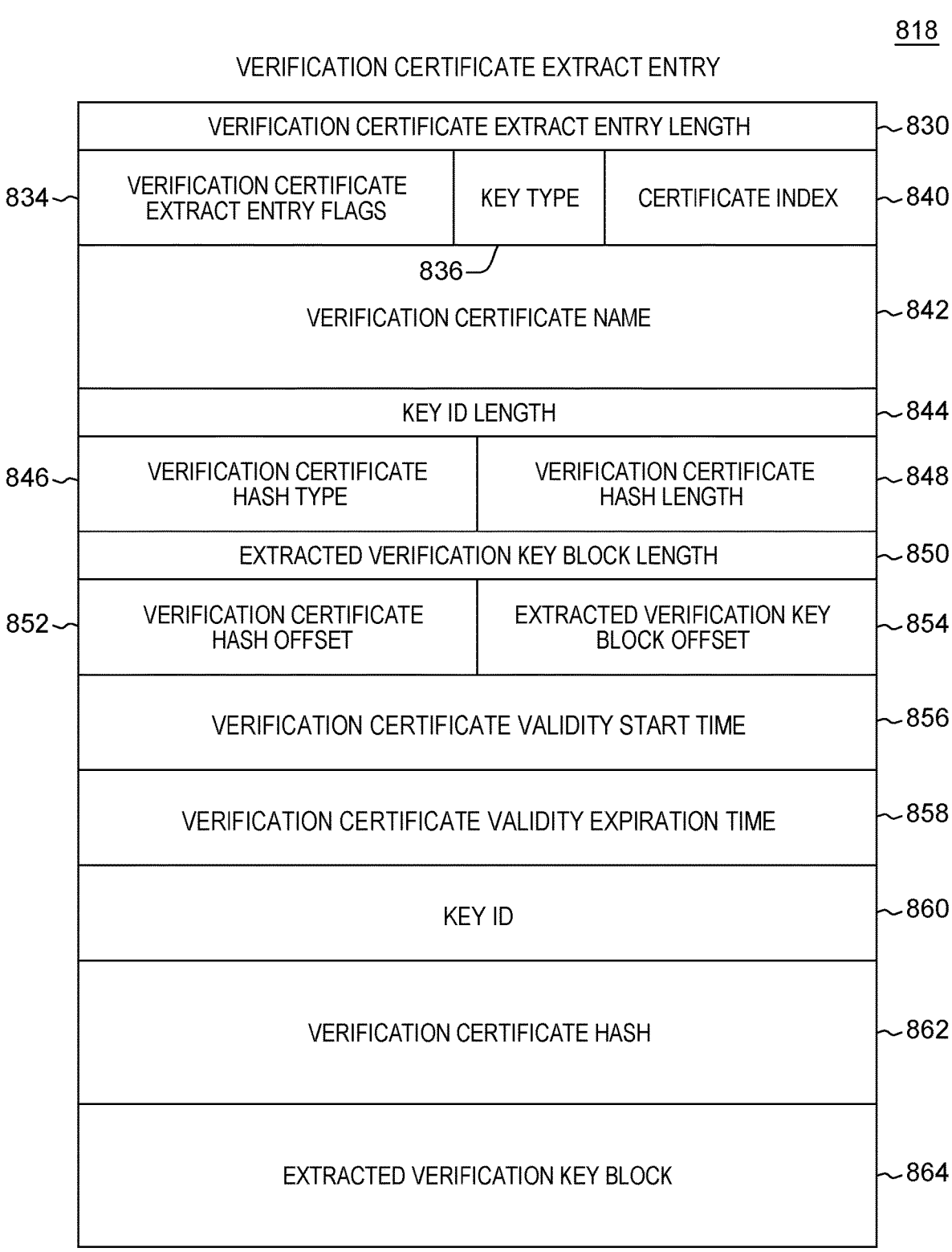
FIG. 8B depicts one example of a verification certificate extract entry of the verification certificate extract block of FIG. 8A, in accordance with one or more aspects of the present invention.

In one example, as shown in FIG. 8B, a verification certificate extract entry 818 includes the following fields:

Verification Certificate Extract Entry Length 830: This field (e.g., word 0) includes an unsigned binary integer (e.g., 32-bit) specifying a number of bytes in the entire verification certificate extract entry. The verification certificate extract entry length field value is a multiple of, e.g., 4-bytes.

Verification Certificate Extract Entry Flags 834: This field (e.g., byte 0 of word 1) includes a flag field defined as follows, in one example:

| Bit | Meaning |
|-----|---------|
| 0 | Verification Certificate Extract Valid (VCXV): When bit 0 is, e.g., one, the verification certificate extract is valid for this configuration and the verification certificate extract entry includes the verification certificate. When the bit is, e.g., zero, the verification certificate extract is invalid for this configuration and the verification certificate extract entry length is set to, e.g., 72. |
| 1-7 | Reserved |

In one example, the verification certificate extract valid flag is used to indicate that the verification certificate extract is invalid for this configuration instead of removing the invalid verification certificate extracts (holes) every time they are obtained from the machine by the hypervisor by compacting the verification certificate extracts storage and renumbering them using different index values of all the currently valid verification certificate extracts.

In one example, if the verification certificate extract is invalid (VCXV=0), then the program can perform the following operations to determine if it is really invalid:

Granular error detection of one function using another function:

Subcode 3 indicates a verification certificate extract entry is invalid (unsupported key type).

Software issues subcode 2 to obtain the actual verification certificate (VC) for which the verification certificate extract (VCX) was not created.

If the actual verification certificate (VC) (obtained using subcode 2) is valid and its key type is the same as one of the supported subcode 3 key types, then the machine did not generate a verification certificate extract for it when it should have, and therefore, an error can be reported by the software.

Key Type 836: This field (e.g., byte 1 of word 1) includes an unsigned binary integer (e.g., 8-bit) specifying the key type of the public key used to verify the signature of one or more signed binary code components.

The key type field values are defined as follows, in one example:

| Value | Meaning |
|-------|---------|
| 0 | Unsupported key type |
| 1 | ECDSA - NIST Curve P521 |
| 2-255 | Reserved |

Certificate Index 840: This field (e.g., bytes 2-3 of word 1) includes an unsigned binary integer (e.g., 16-bit) specifying the index of the current verification certificate extract in the certificate store for the current configuration. It also represents the index of the directly associated verification certificate.

Verification Certificate Name 842: This field (e.g., words 2-17) includes a name (e.g., 64-byte) of the verification certificate (from which the verification certificate extract was created) as it appears on the service element panel. In one example, the verification certificate name is used to identify a verification certificate extract in the certificate store via, e.g., a service element since the verification certificate extract index is an internal mechanism and not displayed in the service element panel. Other possibilities exist.

Key ID Length 844: This field (e.g., bytes 2-3 of word 18) includes an unsigned binary integer (e.g., 16-bit) specifying a number of, e.g., bytes in the key ID field. The key ID length field value is a multiple of, e.g., 1-byte.

Verification Certificate Hash Type 846: This field (e.g., byte 1 of word 19) includes an unsigned binary integer (e.g., 8-bit) specifying the hash type of the verification certificate hash (a.k.a., fingerprint) used to identify a verification certificate from which the extracted material is obtained. The verification certificate hash type field values are defined as follows, in one example:

| Value | Meaning |
|-------|---------|
| 0 | Unsupported verification certificate hash type |
| 1 | SHA2-256 (Secure Hash Algorithm) |
| 2-255 | Reserved |

Verification Certificate Hash Length 848: This field (e.g., bytes 2-3 of word 19) includes an unsigned binary integer (e.g., 16-bit) specifying a number of bytes in the verification certificate hash field. The verification certificate hash length field value is a multiple of, e.g., 1-byte.

Extracted Verification Key Block (XVKB) Length 850: This field (e.g., word 21) includes an unsigned binary integer (e.g., 32-bit) specifying a number of bytes in the extracted verification key block field. The extracted verification key block length field value is a multiple of, e.g., 4-bytes.

Verification Certificate Hash Offset 852: This field (e.g., bytes 0-1 of word 24) includes an unsigned binary integer (e.g., 16-bit) specifying an offset of the verification certificate hash field. The verification certificate hash offset field value is a multiple of, e.g., 4-bytes.

Extracted Verification Key Block Offset 854: This field (e.g., bytes 2-3 of word 24) includes an unsigned binary integer (e.g., 16-bit) specifying an offset of the extracted verification key block field. The extracted verification key block offset field value is a multiple of, e.g., 4-bytes.

Verification Certificate Validity Start Time 856: This field (e.g., words 32-33) includes the TOD (time of day) clock time (e.g., the leftmost 8 byes of a store clock extended instruction output, from which the verification certificate is valid). In one example, the time range is used to ensure the verification certificate extract is valid and it can be used to verify the signed binary code component.

Verification Certificate Validity Expiration Time 858: This field (e.g., words 34-35) includes the TOD clock time (e.g., the leftmost 8 byes of the store clock extended instruction output, from which the verification certificate is invalid).

Key ID 860: This field (e.g., words 48-A) includes the key ID used to identify the public key in the verification certificate. The key ID length field specifies, e.g., the number of bytes that are in the key ID field. The key ID field is, e.g., word aligned.

Verification Certificate Hash 862: This field (e.g., words A+1-B) includes the hash value (a.k.a. fingerprint) of the verification certificate (from which the verification certificate extract was created), which can be used to identify a verification certificate in a firmware embedded code implementation. The verification certificate hash length field specifies, e.g., the number of bytes that are in the verification certificate hash field. The verification certificate hash field is, e.g., word aligned. This data is in, e.g., big-endian binary format.

Extracted Verification Key Block 864: This field (e.g., words B+1 through N) of the verification certificate extract entry includes an extracted verification key block (XVKB). In one example, an extracted verification key block has one or more verification key parts of the specified key type. Each extracted verification key block is aligned, e.g., word aligned. Each variable length field within the extracted verification key block is also aligned, e.g., word aligned. In one example, gaps are formed among the extracted verification key blocks using the extracted verification key block length that is a multiple of, e.g., four and among the extracted verification key block fields using the extracted verification key block field offset that is a multiple of, e.g., four to provide, e.g., word boundary alignment. The extracted verification key block field length includes a value that is the actual size of the extracted verification key block field and the unused area (gap) following the extracted verification key block field contains, e.g., zeros.

In one example, each variable length field within the extracted verification key block has an offset and a length. The offset of a variable length field is used to locate that variable length field, and the length of a variable length field is used to determine the number of bytes contained in that variable length field.

In one example, when the specified key type is set to, e.g., 0 (unsupported key-type), the extracted verification key block includes, e.g., unformatted verification key data. The extracted verification key block length field in the verification certificate extract entry includes the number of bytes stored in the extracted verification key block field.

In one example, when the specified key type is set to, e.g., 1 (ECDSA-NIST Curve P521), the elliptic curve verification key block (ECVKB) shows the format of the verification key.

Figure 8C:
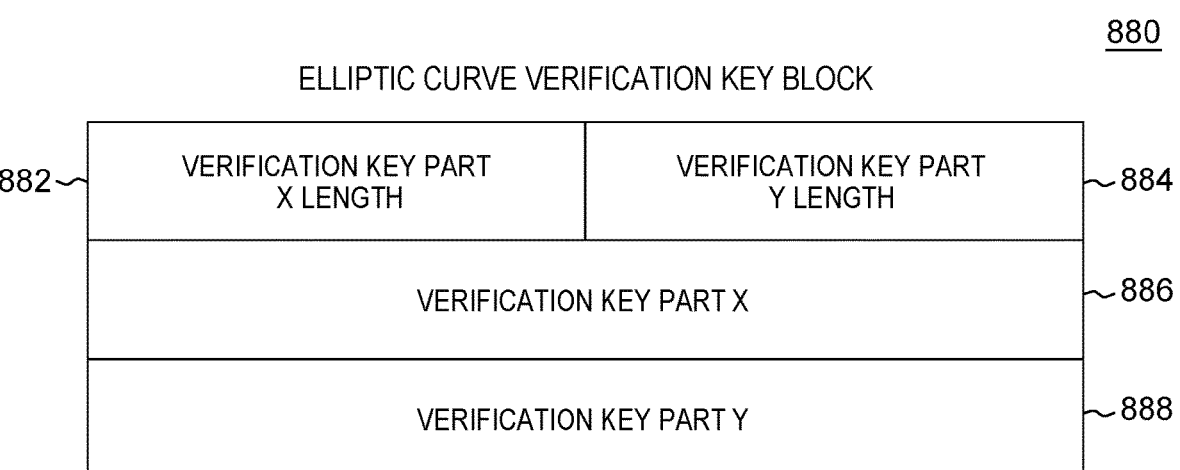
FIG. 8C depicts one example of an elliptic curve verification key block used in accordance with one or more aspects of the present invention.

One example of an elliptic curve verification key block is described with reference to FIG. 8C. In one example, an elliptic curve verification key block 880 includes the following fields, for instance:

Verification Key Part X Length 882: This field (e.g., bytes 0-1 of word 0) includes an unsigned binary integer (e.g., 16-bit) specifying the number of bytes in the verification key part X field. The verification key part X length field value is a multiple of, e.g., 4-bytes.

Verification Key Part Y Length 884: This field (e.g., bytes 2-3 of word 0) includes an unsigned binary integer (e.g., 16-bit) specifying the number of bytes in the verification key part Y field. The verification key part Y length field value is a multiple of, e.g., 4-bytes.

Verification Key Part X 886: This field (e.g., words 1-D) includes the first verification key part (the X component of the point on an elliptic curve) value. The verification key part X length field includes the number of bytes that are in the verification key part X field. The verification key part X field is aligned, e.g., word aligned. The data is in, e.g., big-endian binary format.

Verification Key Part Y 888: This field (e.g., words D+1-N) includes the second signature key part (the Y component of the point on an elliptic curve) value. The verification key part Y length field includes the number of bytes that are in the verification key part Y field. The verification key part Y field is aligned, e.g., word aligned. The data is in, e.g., big-endian binary format.

In one or more aspects, the hypervisor and the program work cooperatively to ensure that the program gets the entire verification certificate extracts list for the current configuration asynchronously in, e.g., a scatter-gather list for the same certificate store version (same certificate store token value) even if the certificate store token value changes while gathering a partial verification certificate extracts list by issuing multiple instances of the Diagnose '0320' instruction. The hypervisor detects a certificate store token mismatch based on a program specified certificate store token value and terminates the instruction instead of wasting machine processing time constructing a response that the program would discard and restart the verification certificate extract collection process.

The Diagnose '0320' instruction locates each verification certificate of the extracted key type from the certificate store for the current configuration, parses and extracts the verification key materials from the verification certificate and returns them in a verification certificate extract entry in the verification certificate extract format, based on the verification certificate extract entries range. The return of verification certificate extracts is further described with reference to FIGS. 5A and 5D.

In one example, referring to FIG. 5A, based on determining 514 that a Diagnose '0320' subcode 3 function is to be performed, process 500 performs 516 the function. Further details relating to performing the function to store verification certificate extracts (subcode 3) are described with reference to FIG. 5D.

In one embodiment, a process 516c determines 570 a range of verification certificate extracts to be stored in, e.g., a verification certificate extract block. For instance, a specified first verification certificate extract index (e.g., index 804 obtained from verification certificate extract block 800 input to the instruction) and a specified last verification certificate index (e.g., index 806 obtained from verification certificate block 800) provide a range of verification certificate extracts that are to be stored by the store verification certificate extract function.

Process 516c determines 572 if verification certificate extracts exist in the certificate store for the specified range or for the requesting configuration in general. If there are one or more verification certificate extracts in the certificate store in the specified range for the requesting configuration, process 516c further determines 573 whether the certificate store token supplied as, e.g., an input to subcode 3 matches the current certificate store token of the requesting configuration. In one example, if the supplied certificate store token value matches the current certificate store token value, process 516c further determines 574 whether there is sufficient storage in the verification certificate extract block for at least one verification certificate extract entry (e.g., verification certificate extract). If there is sufficient storage in the verification certificate extract block for at least one verification certificate extract entry, process 516c stores 576 one or more verification certificate extracts from the certificate store in the verification certificate extract block. Further, process 516c stores 578 a count (e.g., count 814) of the number of verification certificate extracts stored in the verification certificate extract block.

Process 516c determines 582 whether there was sufficient storage to store the requested verification certificate extract entries in the verification certificate block. Should there be insufficient storage to store the requested verification certificate extract entries in the verification certificate extract block, in one example, process 516c sets 586 in the verification certification extract block a stored verification certificate extract count (e.g., count 814) to the number of extract entries stored in the verification certificate extract block and sets 588 in the verification certificate extract block a remaining verification certificate extract count (e.g., count 816) to the number of requested extract entries that could not be stored.

Process 516c returns 590 a response code (e.g., response code 422) of, 0001 hex, e.g., in one example.

Returning to inquiry 582, if there is sufficient storage to store the requested verification certificate extracts, process 516c returns 590 a response code (e.g., response code 422) of, 0001 hex, e.g., in one example.

Returning to inquiry 572, if no verification certificate extracts exist for the specified range or for the configuration, process 516c sets 592 a verification certificate extract block output length (e.g., length 810) to a defined length (e.g., 64); sets 586 the stored verification certificate extract count (e.g., count 814) to, e.g., zero; and sets 588 the remaining verification certificate extract count (e.g., count 816) to, e.g., zero. Process 516c returns 590 a response code (e.g., response code 422) of, e.g., 0001 hex.

Further, returning to inquiry 573, if the supplied certificate store token value does not match the current certificate store token value, process 516c returns a response code (e.g., response code 422) of, e.g., 0306 hex, indicating an error.

Moreover, returning to inquiry 574, if sufficient storage is not indicated in, e.g., verification certificate extract block input length 802 to store at least the first requested verification certificate extract, none of the requested verification certificate extract entries are stored, and process 516c sets 592 verification certificate extract block output length 810 to a defined value (e.g., 64); sets 586 stored verification certificate extract count 814 to, e.g., zero; and sets 588 remaining verification certificate extract count 816 to, e.g., a count of the verification certificate extract entries that could not be stored. Process 516c returns 590 a response code (e.g., response code 422) of, e.g., 0001 hex.

In one or more aspects, the machine is used to locate, parse, extract and return extracted verification certificate material based on a specified key type, which eliminates the need for each program to duplicate the same locate, complex parse and extract code. In one example, granular error detection of one function (subcode 3) using another function (subcode 2) to validate proper extraction is done by the machine. In one example, the machine may have to remove the invalid verification certificate extracts (holes), e.g., every time they are obtained from the machine by the hypervisor by compacting the verification certificate extracts storage and renumbering them using different index values of all the currently valid verification certificate extracts.

In one or more aspects, the program does not have to continuously check for changes in the verification certificate extracts list for the current configuration which speeds up the checking process and eliminates some coding efforts and testing by each software. The hypervisor does not waste processing time constructing a response that the program would discard anyway. The program has the freedom to obtain verification certificate extract entries using an entry range to match its storage management scheme that works best for each software. Using the dynamically updatable certificate store (instead of firmware embedded certificates) allows the customer to easily update the certificate store with new verification certificate extracts when new certificates are available to verify the signed code component. A mechanism is provided to associate and display a verification certificate in the certificate store via, e.g., a service element panel with a software obtained verification certificate using, for example, the verification certificate name and verification certificate index. The program is able to internally associate a verification certificate using, for instance, the verification certificate name, key ID, fingerprint, and/or verification certificate index, as examples.

In one example of the diagnose instruction, a response code is provided for the subcodes. As examples, a response code of 0001 hex indicates the function completed successfully; and a response code other than 0001 hex indicates that the function did not complete successfully.

Example response codes are defined, in one or more embodiments:

'0001': The specified subcode completed successfully.

'0102': The specified subcode is not supported.

'0202': Subcode 1 has been specified but the verification certificate storage size block length field does not contain, e.g., a 128 minimum.

'0204': Subcode 2 has been specified but the verification certificate block input length field value is not, e.g., a nonzero multiple of, e.g., 4K-bytes.

'0206': Subcode 3 has been specified but the verification certificate extract block input length field value is not, e.g., a nonzero multiple of, e.g. 4K-bytes.

'0302': Subcode 2 has been specified but the value of a first verification certificate index is greater than the value of the last verification certificate index.

'0304': Subcode 3 has been specified but the value of a first verification certificate extract index is greater than the value of the last verification certificate extract index.

'0306': Subcode 2 or 3 has been specified but the specified certificate store token value does not match the current certificate store token value in the certificate store for the configuration.

Additional, fewer and/or other response codes may be provided. Further, the example values for the response codes are only examples. Other values may be provided.

In one example, Diagnose '0320' can encounter the program exceptions listed below. In each case, instruction execution is suppressed, as an example.

A privileged-operation exception is recognized if the central processing unit is in the problem state.

A specification exception is recognized when Diagnose is provided but Diagnose '0320' is not provided.

A specification exception is recognized when, e.g., bit positions 0-55 of general register $R_3$ are not, e.g., zeros.

A specification exception is recognized when subcode 0-3 is specified and the $R_1$ field does not designate an even-numbered register.

A specification exception is recognized when subcode 1 is specified and the address specified by general register $R_1$ is not designated on a doubleword boundary.

A specification exception is recognized when subcode 2-3 is specified and the address specified by general register $R_1$ is not designated on, e.g., a 4K-byte boundary.

Storage access exceptions will result in no or incomplete data provided.

In one example, the resulting condition code remains unchanged.

Example program exceptions include, for instance:

Access (fetch-subcode 1-3, store-subcode 0-3)

Privileged operation

Specification

Transaction constraint

In one or more examples, the verification certificate and its corresponding extracted key is to have the same index in order to use the same index to match the verification certificate and its corresponding extracted key.

In one or more examples, the certificate store token may be reinitialized and the values from a previous IML (initial machine load) may be reused at each new initial machine load.

In one or more examples, the service element validates and maintains the verification key certificates in the certificate store for the entire machine. They are indexed from, e.g., one to N.

In one or more examples, the service element generates and maintains the extracted key information for specific key types like elliptic curve keys from the verification key certificates.

In one or more examples, the hypervisor gathers the verification certificates from the certificate store for a given configuration. They are indexed from, e.g., one to N. However, from the perspective of a given logical partition, a verification certificate with a valid index may not contain a valid verification key (i.e. there can be holes where an index containing a not valid verification key or an index without any verification certificate information).

In one or more examples, the hypervisor gathers each of these verification certificate extracts (VCX) from the certificate store for a given configuration and separates them by the key type. For each extracted key type, the set of verification certificate extracts is also indexed from, e.g., one to N. However, from the perspective of a given logical partition, a verification certificate extract with a valid index may not contain a valid verification key (i.e. there can be holes where an index contains a not valid verification key or an index without any verification certificate extract information).

In one or more examples, the boot loader and the operating system are allowed to use different versions of verification keys.

In one or more examples, the boot loader and the operating system are to obtain the current verification keys from the certificate store for a given configuration when a re-initial program load is performed.

Other variations and embodiments are possible.

Figure 9A:
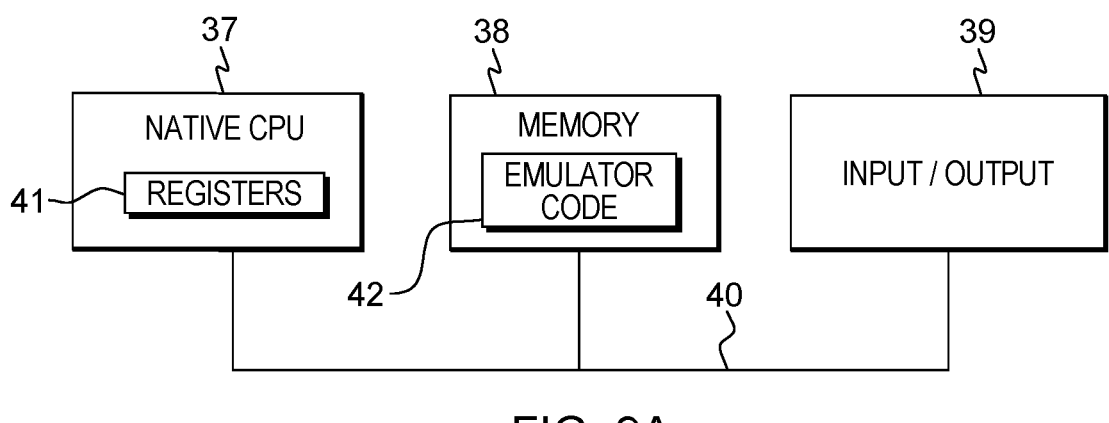
FIGS. 9A-9B depict another example of a computing environment to incorporate and use one or more aspects of the present invention.
Figure 9B:
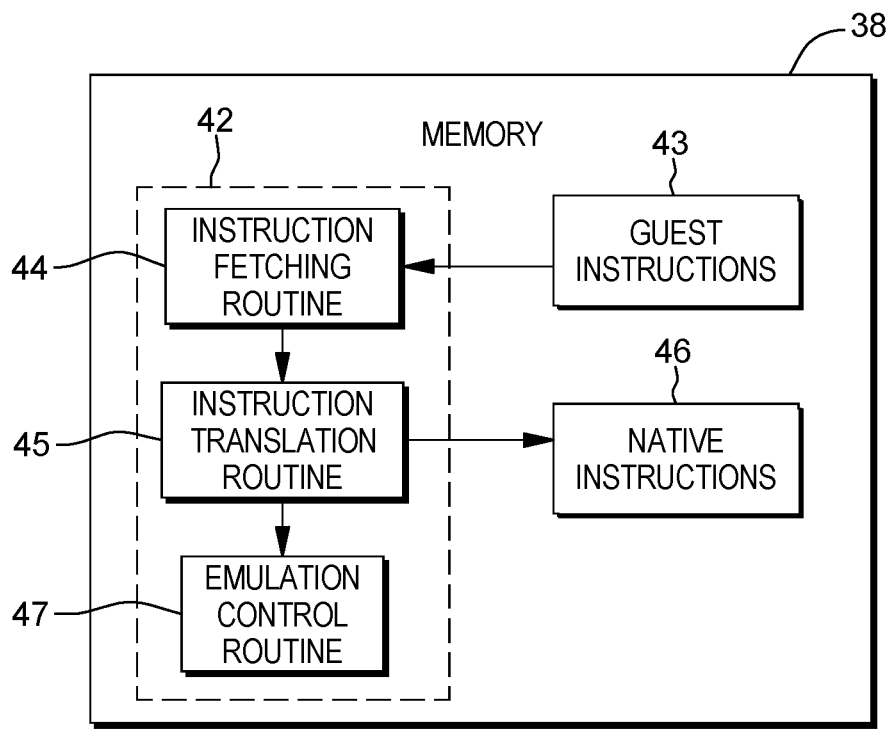

Further, although one or more examples of a computing environment to incorporate and use one or more aspects of the present invention are described herein, FIGS. 9A-9B depict another embodiment of a computing environment to incorporate and use one or more aspects of the present invention.

Referring, initially, to FIG. 9A, in this example, a computing environment 36 includes, for instance, a native central processing unit (CPU) 37 based on one architecture having one instruction set architecture, a memory 38, and one or more input/output devices and/or interfaces 39 coupled to one another via, for example, one or more buses 40 and/or other connections.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture (different from the one architecture) and to execute software and instructions developed based on the other architecture.

Further details relating to emulator code 42 are described with reference to FIG. 9B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the other instruction set architecture, but instead, are being emulated on native CPU 37, which may be, for example, the one instruction set architecture. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An example instruction that may be emulated is the diagnose instruction described herein, in accordance with one or more aspects of the present invention.

The computing environments described herein are only examples of computing environments that can be used. One or more aspects of the present invention may be used with many types of environments. The computing environments provided herein are only examples. Each computing environment is capable of being configured to include one or more aspects of the present invention. For instance, each may be configured to implement diagnose and/or initial program load processing and/or to perform one or more other aspects of the present invention.

One or more aspects of the present invention are tied to computer technology and facilitate processing within a computer, improving performance thereof. For instance, processing associated with verification certificates is facilitated, improving processing within a computing environment. By using a single architected instruction to perform a plurality of operations for a subcode, processing relating to the certificate store is streamlined and storage costs are reduced. Processing within a processor, computer system and/or computing environment is improved.

In one or more aspects, a capability is provided to obtain verification information (e.g., public keys and the type of key) for a trusted source for 1-n keys. The actual keys can be different types, different lengths, etc. In one or more aspects, certificates, as well as certificate extracts, are provided. The extracts are provided in a more consumable form as the user does not need to understand how to parse the certificate itself, instead, it is standardized (for the specific implementation) form regardless of the type of certificate.

In one or more aspects, the current verification information can be obtained at any time, meaning a program can be loaded after the initial boot and if that happens, the verification information in effect at that time will be used.

In one or more aspects, the certificate store includes the certificates and certificate extracts for specific key types (in one example, no software modules) so there is no predefined pair of software module and the corresponding certificate. The program obtains the current set of verification keys from the certificate store by executing an instruction and uses the obtained keys, one at a time, to validate each signed software module.

In one or more aspects, multiple keys and information associated with each software module allow for verification of one or more programs, etc. to be loaded into memory. In one or more aspects, more than one key and its information could be used to verify a single program being loaded into memory and/or to verify multiple programs and any combination thereof.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other instruction formats, operands and/or registers may be used. Although pages of memory or storage are mentioned, one or more aspects may be used for other units or sizes of memory or storage. Further, other data units may be specified (e.g., byte is only one example). Moreover, although a hypervisor is described herein as performing certain aspects in one or more embodiments, one or more of the aspects may be performed by one or more additional and/or other entities, components, etc. Further, material may be extracted for other types of keys. Moreover, other types of certificates may be stored in the certificate store and provided using one or more aspects of the present invention. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage media and program instructions collectively stored on the one or more computer readable storage media to perform a method comprising:
      executing an instruction issued by a program executing within the computing environment, the instruction being a single architected instruction and including an operation code indicating a diagnose operation, and the instruction including input provide ed by the program including a subcode specifying a particular function of the instruction to be executed and a token, the instruction, based on the subcode, to obtain for use by the program one or more verification certificates to be used to perform verification within the computing environment, the executing the instruction including:
         obtaining the token from the input to the instruction;
         comparing the token to a current token for a configuration of the computing environment; and
         returning, for use by the program, one or more verification certificates from a certificate store, based on the token matching the current token, the one or more verification certificates to be used in verification of one or more programs to be loaded from an input/output device of the computing environment to memory.

2. The computer program product of claim 1, wherein the one or more verification certificates returned includes one or more verification certificates in a range of verification certificates, the range of verification certificates specified using a control block of the instruction.

3. The computer program product of claim 1, wherein the returning includes storing the one or more verification certificates in a control block specified by the instruction.

4. The computer program product of claim 1, wherein the instruction is configured to perform a plurality of functions specified by a plurality of subcodes, the instruction being executed based on a selected subcode of the plurality of subcodes, and wherein the method further comprises executing another instance of the instruction based on another selected subcode, the executing the another instance of the instruction comprising:
   obtaining the token based on executing the another instance of the instruction;
   comparing the token to the current token for the configuration; and
   returning one or more verification certificate extracts from the certificate store, based on the token matching the current token.

5. The computer program product of claim 4, wherein the one or more verification certificate extracts returned includes one or more verification certificate extracts in a range of verification certificate extracts, the range of verification certificate extracts specified using a control block of the another instance of the instruction.

6. The computer program product of claim 1, wherein the instruction is configured to perform a plurality of functions specified by a plurality of subcodes, and wherein the token is previously returned as an output from a previous execution of the instruction, the previous execution of the instruction executing based on one subcode of the plurality of subcodes, and wherein the token that is previously returned is provided as the input to the instruction being executed, the instruction being executed based on another subcode of the plurality of subcodes.

7. The computer program product of claim 6, wherein the previous execution of the instruction returns storage size information for the configuration, the storage size information to be used to determine an amount of storage to be used to store the one or more verification certificates.

8. The computer program product of claim 7, wherein the storage size information includes a plurality of storage sizes corresponding to a verification certificate block, the verification certificate block to store at least one verification certificate of the one or more verification certificates.

9. The computer program product of claim 8, wherein the plurality of storage sizes includes a verification certificate block length that specifies a number of data units in the verification certificate block with a verification certificate entry that is a largest verification certificate entry compared to other verification certificate entries in the certificate store for the configuration, a total length of the verification certificate block specifying a total number of data units to be used to store the verification certificate block with one or more verification certificate entries available in the certificate store for the configuration, and a verification certificate entry length that specifies a number of data units of a verification certificate entry that is a potential largest verification certificate entry compared to other verification certificate entries to be stored in the certificate store for the configuration.

10. The computer program product of claim 6, wherein the previous execution of the instruction returns storage size information for the configuration, the storage size information to be used to determine an amount of storage to be used to store one or more verification certificate extracts, and wherein the storage size information includes a plurality of storage sizes corresponding to a verification certificate extract block, the verification certificate extract block to store at least one verification certificate extract of the one or more verification certificate extracts.

11. A computer system for facilitating processing within a computing environment, the computer system comprising:
   a memory; and
   a processor in communication with the memory, wherein the computer system is configured to perform a method, said method comprising:
      executing an instruction issued by a program executing within the computing environment, the instruction being a single architected instruction and including an operation code indicating a diagnose operation, and the instruction including input provided by the program including a subcode specifying a particular function of the instruction to be executed and a token, the instruction, based on the subcode, to obtain for use by the program one or more verification certificates to be used to perform verification within the computing environment, the executing the instruction including:
      obtaining the token from the input to the instruction;
      comparing the token to a current token for a configuration of the computing environment; and
      returning, for use by the program, one or more verification certificates from a certificate store, based on the token matching the current token, the one or more verification certificates to be used in verification of one or more programs to be loaded from an input/output device of the computing environment to memory.

12. The computer system of claim 11, wherein the one or more verification certificates returned includes one or more verification certificates in a range of verification certificates, the range of verification certificates specified using a control block of the instruction, and wherein the returning includes storing the one or more verification certificates in a control block specified by the instruction.

13. The computer system of claim 11, wherein the instruction is configured to perform a plurality of functions specified by a plurality of subcodes, the instruction being executed based on a selected subcode of the plurality of subcodes, and wherein the method further comprises executing another instance of the instruction based on another selected subcode, the executing the another instance of the instruction comprising:
   obtaining the token based on executing the another instance of the instruction;
   comparing the token to the current token for the configuration; and
   returning one or more verification certificate extracts from the certificate store, based on the token matching the current token.

14. The computer system of claim 11, wherein the instruction is configured to perform a plurality of functions specified by a plurality of subcodes, and wherein the token is previously returned as an output from a previous execution of the instruction, the previous execution of the instruction executing based on one subcode of the plurality of subcodes, and wherein the token that is previously returned is provided as the input to the instruction being executed, the instruction being executed based on another subcode of the plurality of subcodes.

15. The computer system of claim 14, wherein the previous execution of the instruction returns storage size information for the configuration, the storage size information to be used to determine an amount of storage to be used to store the one or more verification certificates and an amount of storage to be used to store one or more verification certificate extracts.

16. A computer-implemented method of facilitating processing within a computing environment, the computer-implemented method comprising:
   executing an instruction issued by a program executing within the computing environment, the instruction being a single architected instruction and including an operation code indicating a diagnose operation, and the instruction including input provided by the program including a subcode specifying a particular function of the instruction to be executed and a token, the instruction, based on the subcode, to obtain for use by the program one or more verification certificates to be used to perform verification within the computing environment, the executing the instruction including:
   obtaining the token from the input to the instruction;
   comparing the token to a current token for a configuration of the computing environment; and
   returning, for use by the program, one or more verification certificates from a certificate store, based on the token matching the current token, the one or more verification certificates to be used in verification of one or more programs to be loaded from an input/output device of the computing environment to memory.

17. The computer-implemented method of claim 16, wherein the one or more verification certificates returned includes one or more verification certificates in a range of verification certificates, the range of verification certificates specified using a control block of the instruction, and wherein the returning includes storing the one or more verification certificates in a control block specified by the instruction.

18. The computer-implemented method of claim 16, wherein the instruction is configured to perform a plurality of functions specified by a plurality of subcodes, the instruction being executed based on a selected subcode of the plurality of subcodes, and wherein the method further comprises executing another instance of the instruction based on another selected subcode, the executing the another instance of the instruction comprising:

obtaining the token based on executing the another instance of the instruction;

comparing the token to the current token for the configuration; and returning one or more verification certificate extracts from the certificate store, based on the token matching the current token.

19. The computer-implemented method of claim 16, wherein the instruction is configured to perform a plurality of functions specified by a plurality of subcodes, and wherein the token is previously returned as an output from a previous execution of the instruction, the previous execution of the instruction executing based on one subcode of the plurality of subcodes, and wherein the token that is previously returned is provided as the input to the instruction being executed, the instruction being executed based on another subcode of the plurality of subcodes.

20. The computer-implemented method of claim 19, wherein the previous execution of the instruction returns storage size information for the configuration, the storage size information to be used to determine an amount of storage to be used to store the one or more verification certificates and amount of storage to be used to store one or more verification certificate extracts.

21. The computer program product of claim 1, wherein the certificate store is dynamically updatable by a user.

22. A computer program product for facilitating processing within a computing environment, the computer program product comprising:

one or more computer readable storage media and program instructions collectively stored on the one or more computer readable storage media to perform a method comprising:

executing an instruction issued by a program executing within the computing environment, the instruction being a single architected instruction and including an operation code indicating a diagnose operation, and the instruction including input provided by the program including a subcode specifying a particular function of the instruction to be executed and a token, the instruction, based on the subcode, to obtain for use by the program one or more verification certificate extracts to be used to perform verification within the computing environment, the executing the instruction including:

obtaining the token from the input to the instruction;

comparing the token to a current token for a configuration of the computing environment; and returning, for use by the program, one or more verification certificate extracts from a certificate store, based on the token matching the current token, the one or more verification certificate extracts to be used in verification of one or more programs to be loaded from an input/output device of the computing environment to memory.

23. The computer program product of claim 1, wherein the obtaining the token, the comparing the token and the returning the one or more verification certificates are performed as part of executing the single architected instruction.

24. The computer program product of claim 22, wherein the certificate store is dynamically updatable by a user.

25. A method comprising:

executing an instruction issued by a program executing within a computing environment, the instruction being a single architected instruction and including an operation code indicating a diagnose operation, and the instruction including input provided by the program including a subcode specifying a particular function of the instruction to be executed and a token, the instruction, based on the subcode, to obtain for use by the program one or more verification certificate extracts to be used to perform verification within the computing environment, the executing the instruction including:

obtaining the token from the input to the instruction;

comparing the token to a current token for a configuration of the computing environment; and returning, for use by the program, one or more verification certificate extracts from a certificate store, based on the token matching the current token, the one or more verification certificate extracts to be used in verification of one or more programs to be loaded from an input/output device of the computing environment to memory.

* * * * *